United States Patent
Miyata et al.

(10) Patent No.: US 8,883,387 B2
(45) Date of Patent: Nov. 11, 2014

(54) ELECTROSTATIC IMAGE DEVELOPING TONER AND MANUFACTURING METHOD OF THE SAME, ELECTROSTATIC IMAGE DEVELOPER, TONER CARTRIDGE, PROCESS CARTRIDGE, IMAGE FORMING APPARATUS, AND IMAGE FORMING METHOD

(71) Applicant: Fuji Xerox Co., Ltd., Tokyo (JP)

(72) Inventors: Emi Miyata, Kanagawa (JP); Sumiaki Yamasaki, Kanagawa (JP); Satoshi Hiraoka, Kanagawa (JP); Yuki Sasaki, Kanagawa (JP); Susumu Yoshino, Kanagawa (JP); Hirotaka Matsuoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/626,611

(22) Filed: Sep. 25, 2012

(65) Prior Publication Data
US 2013/0084520 A1 Apr. 4, 2013

Related U.S. Application Data

(63) Continuation-in-part of application No. 13/296,494, filed on Nov. 15, 2011, now Pat. No. 8,628,902.

(30) Foreign Application Priority Data

Apr. 15, 2011 (JP) .................................. 2011-091570
Sep. 27, 2011 (JP) .................................. 2011-211251
Apr. 13, 2012 (JP) .................................. 2012-092446

(51) Int. Cl.
*G03G 9/087* (2006.01)
*G03G 9/08* (2006.01)
*C08L 67/02* (2006.01)

(52) U.S. Cl.
CPC ........ *G03G 9/08755* (2013.01); *G03G 9/08797* (2013.01); *G03G 9/0804* (2013.01); *C08L 67/02* (2013.01); *G03G 9/08795* (2013.01); *G03G 9/08775* (2013.01); *G03G 63/672* (2013.01)
USPC ................ 430/109.4; 430/109.1; 430/123.41; 430/137.14; 399/252

(58) Field of Classification Search
USPC ................ 430/109.4, 109.1, 123.41, 137.14; 399/252
See application file for complete search history.

(56) References Cited

U.S. PATENT DOCUMENTS

| 4,981,939 A | 1/1991 | Matsumura et al. |
| 2003/0162115 A1 | 8/2003 | Uchinokura et al. |

(Continued)

FOREIGN PATENT DOCUMENTS

| DE | 3738777 | * 5/1988 | ............... G03G 9/08 |
| JP | A-63-127253 | 5/1988 | |

(Continued)

OTHER PUBLICATIONS

Apr. 9, 2013 Japanese Office Action issued in Japanese Patent Application No. 2012-092446 (with translation).

(Continued)

*Primary Examiner* — Peter Vajda
(74) *Attorney, Agent, or Firm* — Oliff PLC

(57) ABSTRACT

An electrostatic image developing toner of the exemplary embodiment of the invention contains an amorphous first polyester resin of a polycondenzation product of at least a carboxylic acid component and an alcohol component containing rosin, and a second polyester resin having the difference (absolute value) in parameter of solubility relative to the first polyester resin of from about 0.3 $(cal/cm^3)^{1/2}$ to about 3 $(cal/cm^3)^{1/2}$.

13 Claims, 2 Drawing Sheets

(56) References Cited

U.S. PATENT DOCUMENTS

| | | |
|---|---|---|
| 2003/0203301 A1 | 10/2003 | Iga |
| 2007/0218389 A1* | 9/2007 | Honda et al. ............. 430/108.22 |
| 2008/0131802 A1 | 6/2008 | Mizutani et al. |
| 2009/0156784 A1* | 6/2009 | Kubo et al. .................... 530/211 |
| 2010/0183964 A1* | 7/2010 | Yoshida et al. ............ 430/107.1 |
| 2010/0196817 A1* | 8/2010 | Sasaki et al. ............... 430/109.4 |
| 2010/0209835 A1* | 8/2010 | Takahashi et al. ............ 430/105 |
| 2010/0291481 A1 | 11/2010 | Yamada et al. |
| 2012/0183896 A1 | 7/2012 | Sacripante et al. |
| 2012/0264041 A1 | 10/2012 | Yamasaki et al. |
| 2013/0071785 A1 | 3/2013 | Moroiwa et al. |

FOREIGN PATENT DOCUMENTS

| | | |
|---|---|---|
| JP | A-2004-163836 | 6/2001 |
| JP | A-2005-309178 | 11/2005 |
| JP | A-2006-292820 | 10/2006 |
| JP | A-2007-137910 | 6/2007 |
| JP | A-2007-322932 | 12/2007 |
| JP | A-2008-139647 | 6/2008 |
| JP | A-2008-281882 | 11/2008 |
| JP | A-2008-281884 | 11/2008 |
| JP | B2-4505738 | 7/2010 |
| JP | A-2011-2802 | 1/2011 |
| JP | B1-4699558 | 3/2011 |
| JP | A-2012-149254 | 8/2012 |
| JP | A-2012-172027 | 9/2012 |
| JP | A-2012-229413 | 11/2012 |
| JP | A-2012-229419 | 11/2012 |
| JP | A-2012-229420 | 11/2012 |
| JP | A-2012-230374 | 11/2012 |
| JP | A-2012-230375 | 11/2012 |
| JP | A-2012-230376 | 11/2012 |

OTHER PUBLICATIONS

Jul. 2, 2012 Extended European Search Report issued in European Application No. 11 19 0248.2.

U.S. Appl. No. 13/296,494 in the name of Yamasaki et al., filed Nov. 15, 2011.

* cited by examiner

ELECTROSTATIC IMAGE DEVELOPING TONER AND MANUFACTURING METHOD OF THE SAME, ELECTROSTATIC IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This is a Continuation-In-Part application of U.S. application Ser. No. 13/296,494 filed in the United States on Nov. 15, 2011; the entire content of which is hereby incorporated by reference.

Further, this application is based on and claims priority under 35 USC 119 from Japanese Patent Application No. 2012-092446 filed on Apr. 13, 2012, Japanese Patent Application No. 2011-211251 filed on Sep. 27, 2011.

BACKGROUND

1. Field

The present invention relates to an electrostatic image developing toner, the manufacturing method of the same, an electrostatic image developer, a toner cartridge, a process cartridge, an image forming apparatus, and an image forming method.

2. Description of the Related Art

Methods of visualizing image data via an electrostatic latent image such as an electrophotographic method are now widely used in various fields. In the electrophotographic method, an electrostatic latent image is formed on a photoconductor by a charging process and an exposure process, the latent image is developed with a developer containing a toner, and visualized through a transfer process and a fixing process.

For example, there is proposed in JP-A-2005-309178 (The term "JP-A" as used herein refers to an "unexamined published Japanese patent application".) "an electrostatic image developing color toner containing a polyester resin as a binder resin containing (1) disproportionation rosin, and (2) a terephthalic acid and/or an isophthalic acid as acid components, and (3) glycidyl ester of tertiary fatty acid, and (4) an aliphatic diol having 2 to 10 carbon atoms as alcohol components".

"A toner obtained by emulsifying and dispersing particles containing at least polyester resin particles in an aqueous medium, and aggregating the particles, wherein the polyester resin particles contain a polyester resin, and the polyester resin is obtained by polycondensation of an alcohol component containing 65 mol % or more of 1,2-propanediol in a dihydric alcohol component with a carboxylic acid component containing purified rosin" is proposed in JP-A-2008-281882.

"A toner containing a carboxylic acid component containing purified rosin, a polyester resin containing propylene glycol accounting for 65% or more of the alcohol component as a binder resin, and a fixing assistant (described as a crystalline polyester resin in the subordination claim)" is proposed in JP-A-2008-281884.

"A toner for electrophotography containing polyester resin (A) and polyester resin (B) having a softening temperature higher than the softening point of polyester resin (A) by 10° C. or more as binder resins, wherein at least either one of polyester resin (A) or polyester resin (B) is a resin deriving from a fumaric acid/maleic acid modified resin having a polyester unit which can be obtained by polycondensation of an alcohol component and a carboxylic acid component containing fumaric acid-modified rosin and/or maleic acid-modified rosin" is proposed in JP-A-2007-322932.

SUMMARY

The above object can be solved by the following means.
(1) An Electrostatic Image Developing Toner Including:
an amorphous first polyester resin of a polycondensation product of at least a carboxylic acid component and an alcohol component containing rosin, and
a second polyester resin having the difference (absolute value) in parameter of solubility relative to the first polyester resin of from about 0.3 $(cal/cm^3)^{1/2}$ to about 3 $(cal/cm^3)^{1/2}$.

BRIEF DESCRIPTION OF THE DRAWINGS

Exemplary embodiments of the present invention will be described in detail based on the following figures, wherein.

Figure 1:
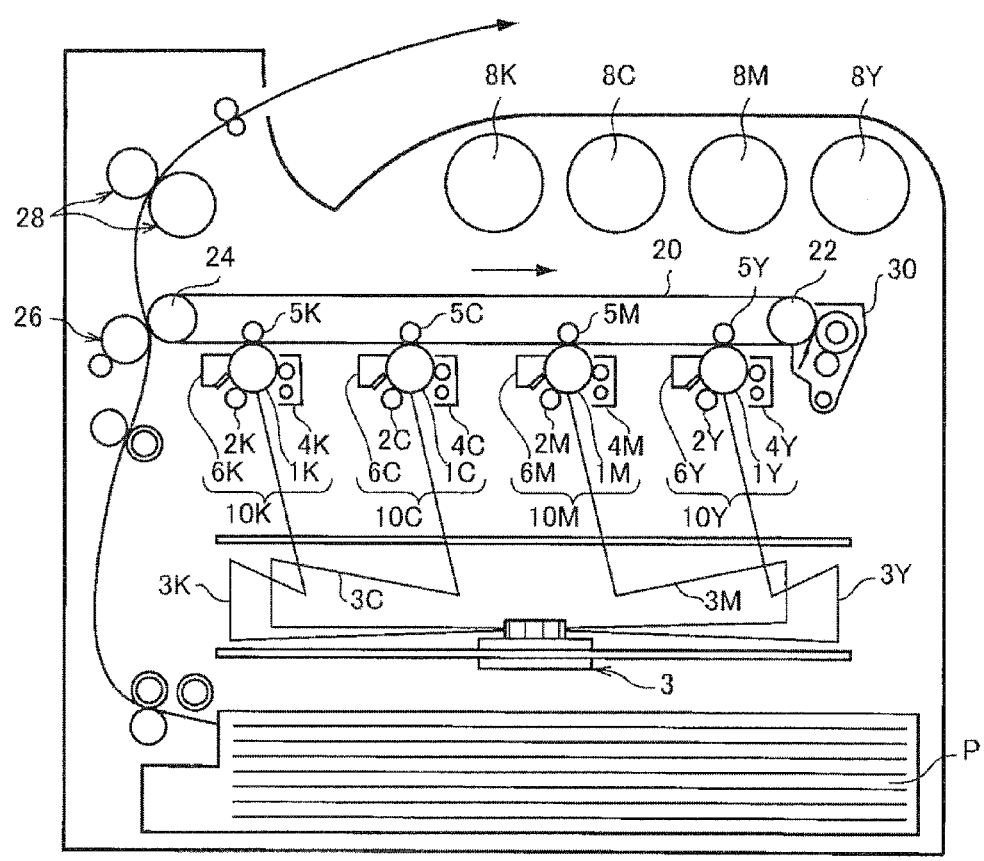
FIG. 1 is a schematic drawing showing an example of an image forming apparatus in the exemplary embodiment.

wherein 1Y, 1M, 1C, 1K, 107 denotes Photoconductor (an example of image holding member); 2Y, 2M, 2C, 2K, 108 denote Roller (an example of charging unit); 3Y, 3M, 3C, 3K denote Laser Beam; 3, 110 denote Exposure apparatus (an example of electrostatic image forming units); 4Y, 4M, 4C, 4K, 111 denote Developing apparatus (an example of developing unit); 5Y, 5M, 5C, 5K denote First transfer roller; 6Y, 6M, 6C, 6K, 113 denote Cleaning apparatus of a photoconductor; 8Y, 8M, 8C, 8K denote Toner cartridge; 10Y, 10M, 10C, 10K denote Image forming unit; 20 denotes Intermediate transfer belt; 22 denotes Driving roller, 24 denotes Support roller; 26 denotes Second transfer roller (an example of transfer unit); 28, 115 denote Fixing apparatus (an example of fixing unit); 30 denotes Cleaning apparatus of intermediate transfer member; 112 denotes Transfer apparatus; 116 denotes Mounting rail; 117 denotes Opening for antistatic exposure; 118 denotes Opening for exposure; 200 denotes Process cartridge; P, 300 denote Recording paper (image-receiving medium).

DETAILED DESCRIPTION OF EXEMPLARY EMBODIMENTS

The exemplary embodiment which is an example of the invention will be described in detail below.
[Electrostatic Image Developing Toner]

The electrostatic image developing toner according to the exemplary embodiment (hereinafter also referred to as "toner") is constituted by an amorphous first polyester resin which is a polycondensation product of at least a carboxylic acid component and an alcohol component containing rosin, and a second polyester resin having the difference (absolute value) in the parameter of solubility relative to the first polyester resin of from 0.3 $(cal/cm^3)^{1/2}$ to 3 $(cal/cm^3)^{1/2}$ or from about 0.3 $(cal/cm^3)^{1/2}$ to about 3 $(cal/cm^3)^{1/2}$.

The toner according to the exemplary embodiment can obtain a fixed image having high image strength by the above constitution.

The reason for this is not clear but is presumed as follows.
Since an amorphous polyester resin having an alcohol component containing rosin as the repeating unit component of the polycondensation product has bulky groups deriving from the rosin in the side chain, the main chain becomes stiff and entanglements between the molecules are liable to be gone away. As a result, a fixed image obtained by the toner containing the amorphous polyester resin is stiff and brittle and the image strength is liable to lower.

While when the second polyester resin having the difference (absolute value) in the parameter of solubility relative to the first polyester resin of from 0.3 (cal/cm$^3$)$^{1/2}$ to 3 (cal/cm$^3$)$^{1/2}$ or from about 0.3 (cal/cm$^3$)$^{1/2}$ to about 3 (cal/cm$^3$)$^{1/2}$ and high compatibility relative to the first polyester resin is contained in a toner together with the amorphous first polyester resin having an alcohol component containing rosin as the repeating unit component of the polycondensation product, both polyester resins are mixed by heating at the time of fixation of a toner image, and the second polyester resin easily entangles the stiff main chain of the amorphous first polyester resin. As a result, the strength of the fixed image is presumably improved.

From the above fact, it is considered that a fixed image having high image strength can be obtained from the toner according to the exemplary embodiment.

In particular, such a phenomenon that the second polyester resin easily entangles the stiff main chains of the amorphous first polyester resin is liable to occur when a crystalline polyester resin is used as the second polyester resin, thus it is considered that a fixed image having high image strength can be easily obtained.

Further, when the weight average molecular weight of the first polyester resin is small, the molecular chains are short and entanglement is difficult. However, when the weight average molecular weight is too big, melt viscosity is liable to become high. Accordingly, by bringing the weight average molecular weight into a proper range, the strength of a fixed image is presumed to be improved due to entanglement.

In addition, when a toner (toner particles) is manufactured by the later-described aggregation coalescence method, first polyester resin and second polyester resin are finely dispersed in the toner and easily compatible at fixing time, as a result, presumably a fixed image having high image strength can be easily obtained.

The toner according to the exemplary embodiment is described in detail below.

The toner according to the exemplary embodiment contains, for example, toner particles and, if necessary, an external additive.

(Toner Particles)

Toner particles are described below.

Toner particles are constituted by a binder resin and, if necessary, a coloring agent, a release agent and other additives.

As the binder resin, at least two kinds of amorphous first polyester resin and second polyester resin are applied.

The second polyester resin may be an amorphous polyester resin or a crystalline polyester resin, but in the light of capable of easily obtaining a fixed image having high image strength, a crystalline polyester resin is preferred.

Here, an amorphous polyester resin is a resin having not a clear endothermic peak but only a stepwise endothermic change in thermal analysis measurement by differential scanning calorimetry (DSC), and amorphous polyester resin is in a solid state at ordinary temperature (e.g., 25° C.) and thermally plasticized at glass transition temperature or higher temperature.

On the other hand, a crystalline polyester resin is a resin showing a clear endothermic peak not a stepwise endothermic change in differential scanning calorimetry (DSC).

Specifically, a crystalline polyester resin means a resin having the half value width of the endothermic peak of within 10° C. when measured at the temperature rising velocity of 10° C./min, and an amorphous polyester resin means a resin having the half value width of exceeding 10° C. or a resin not having a clear endothermic peak.

—First Polyester Resin—

The first polyester resin is an amorphous polyester resin which is a polycondensation product of at least a carboxylic acid component and an alcohol component containing rosin.

The first polyester resin may be a polycondensation product obtained by polycondensation of an alcohol component other than the alcohol component containing rosin in addition to a carboxylic acid component and an alcohol component containing rosin.

As the first polyester resin, specifically, for example, a polyester resin at least having a repeating unit deriving from a dicarboxylic acid component and a repeating unit deriving from a dialcohol component represented by the following formula (1) is exemplified.

The first polyester resin may have a repeating unit deriving from a dialcohol component other than a dialcohol component represented by the following formula (1) together with the repeating unit deriving from a dicarboxylic acid component and the repeating unit deriving from a dialcohol component represented by the following formula (1).

As the carboxylic acid component, at least one kind selected from the group consisting of an aromatic dicarboxylic acid and an aliphatic dicarboxylic acid can be exemplified. For example, aromatic dicarboxylic acids, e.g., phthalic acid, isophthalic acid, terephthalic acid, 1,4-naphthalenedicarboxylic acid, and 2,6-naphthalenedicarboxylic acid; aliphatic dicarboxylic acids, e.g., oxalic acid, malonic acid, maleic acid, fuinaric acid, citraconic acid, itaconic acid, glutaconic acid, succinic acid, adipic acid, sebacic acid, azelaic acid, dimer acid, branched alkylsuccinic acid having 1 to 20 carbon atoms, and branched alkenylsuccinic acid having 1 to 20 carbon atoms and an alkenyl group; anhydrides of these acids; and alkyl esters of these acids (having 1 to 3 carbon atoms) are exemplified. In terms of durability and fixing property of a toner, and dispersibility of a coloring agent, aromatic carboxylic acid compounds are preferred of these.

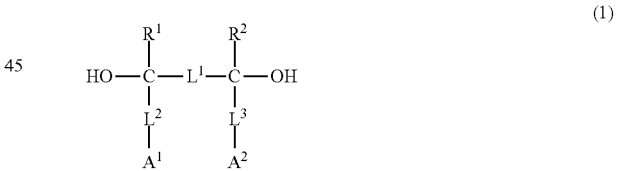

In formula (1), each of $R^1$ and $R^2$ independently represents a hydrogen atom or a methyl group; each of $L^1$, $L^2$ and $L^3$ independently represents a divalent linking group selected from the group consisting of a carbonyl group, an ester group, an ether group, a sulfonyl group, a chained alkylene group which may have a substituent, a cyclic alkylene group which may have a substituent, an arylene group which may have a substituent, and a combination of these groups, and $L^1$ and $L^2$ or $L^1$ and $L^3$ may form a ring.

Each of $A^1$ and $A^2$ independently represents a rosin ester group.

In formula (1), as the chained alkylene group represented by $L^1$, $L^2$ and $L^3$, for example, an alkylene group having 1 to 10 carbon atoms is exemplified.

In formula (1), as the cyclic alkylene group represented by $L^1$, $L^2$ and $L^3$, for example, a cyclic alkylene group having 3 to 7 carbon atoms is exemplified.

In formula (1), as the arylene group represented by $L^1$, $L^2$ and $L^3$, for example, a phenylene group, a naphthylene group and an anthracene group are exemplified.

As the examples of the substituents of the chained alkylene group, the cyclic alkylene group and the arylene group, for example, an alkyl group having 1 to 8 carbon atoms and an aryl group are exemplified, and a linear, branched or cyclic alkyl group is preferred. Specifically, for example, a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclopentyl group, a cyclohexyl group, and a phenyl group are exemplified as the substituents.

The dialcohol component represented by formula (1) is a dialcohol compound having 2 rosin ester groups in one molecule (hereinafter sometimes referred to as "specific rosin diol". In formula (1), each of $R^1$ and $R^2$ represents a hydrogen atom or a methyl group. Each of $A^1$ and $A^2$ represents a rosin ester group.

The rosin ester group is a residue obtained by removing a hydrogen atom from the carboxyl group contained in the rosin.

The specific rosin diol is synthesized by a method known in the art, for example, it is synthesized by reaction of a difunctional epoxy compound and rosin.

The reaction of the rosin and the difunctional epoxy compound primarily progresses by the ring-opening reaction of the carboxyl group of the rosin and the epoxy group of the difunctional epoxy compound. At that time, the reaction is preferably performed at a temperature equivalent to or higher than the melting temperatures of both constituent components, or a temperature capable of homogeneously mixing both constituent components. Specifically, the reaction temperature is generally in the range of from 60° C. to 200° C. A catalyst may be added to accelerate the ring-opening reaction of the epoxy group.

As the catalysts for use in the reaction of the rosin and the difunctional epoxy compound, amines, e.g., ethylenediamine, trimethylamine, and 2-methylimidazole, quaternary ammonium salts, e.g., triethylammonium bromide, triethylammonium chloride, and butyltrimethylammonium chloride, and triphenylphosphine are exemplified.

The reaction of the rosin the difunctional epoxy compound can be performed by various methods. Generally, in the case of a batch system, the rosin and the difunctional epoxy compound are charged in the objective proportion in a flask having a heating function and equipped with a condenser tube, a stirrer, an inert gas inlet, and a thermometer, and heat-melted. The reaction progress is traced by sampling the reactant. The degree of the reaction progress can be confirmed primarily by the reduction of the acid value. The reaction is completed at the stoichiometric reaction terminal or at the point of time of arriving near the terminal point.

The reaction ratio of the rosin and the difunctional epoxy compound is not especially restricted, but the molar ratio in the range of from 1.5 mol to 2.5 mol of the rosin per mol of the difunctional epoxy compound is preferred.

The rosin is a generic name for resin acids obtainable from trees and is a naturally occurring substance which contains abietic acid, a kind of tricyclic diterpenes, and isomers thereof as main components. In addition to abietic acid, the specific components of the rosins include, e.g., palustric acid, neoabietic acid, pimaric acid, dehydroabietic acid, isopimaric acid, and sandaracopimaric acid. The rosin used in the exemplary embodiment is a mixture of these acids.

Rosins are roughly classified into three kinds by the methods of collection, that is, tall rosins with pulps as raw materials, gum rosins with crude turpentine as raw materials, and wood rosins with stubbles of pine trees as raw materials.

At least either of gum rosin or tall rosin is preferred as the rosin for the reason of easily available.

These rosins are preferably purified. Purified rosins are the rosins obtained by removing high molecular weight substances which are considered to be derived from the peroxides of resin acids from unpurified rosins, and removing unsaponified substances contained in unpurified rosins.

Methods of purification are not especially restricted and any method may be selected from various known purification methods. Specifically, distillation, recrystallization and extraction are exemplified. Purification by distillation is industrially preferred. Distillation is generally selected considering the distillation time at from 200° C. to 300° C. and a pressure of 6.67 kPa or less. Recrystallization is performed, for example, by dissolving an unpurified rosin in a good solvent, distilling the solvent to obtain a concentrated solution, and then adding a poor solvent to the solution. As the examples of good solvents, aromatic hydrocarbons, e.g., benzene, toluene and xylene, chlorinated hydrocarbons, e.g., chloroform, alcohols, e.g., a lower alcohol, ketones, e.g., acetone, and acetic esters, e.g., ethyl acetate are exemplified. The examples of poor solvents include hydrocarbon solvents, e.g., n-hexane, n-heptane, cyclohexane, and isooctane. Extraction is a method of dissolving an unpurified rosin in alkaline water to make an alkaline aqueous solution, extracting the insoluble unsaponified substances contained therein with an organic solvent, and neutralizing the aqueous layer to obtain a purified rosin.

The rosin for use in the exemplary embodiment may be a disproportionated rosin. The disproportionated rosin is a rosin obtained by heating at a high temperature a rosin containing an abietic acid as the main component in the presence of a disproportionation catalyst to eliminate unstable conjugated double bonds in the molecule. The disproportionated rosin contains a mixture of a dehydroabietic acid and a dihydroabietic acid as main components.

The disproportionation catalyst may be any of those known in the art, for example, supported catalysts, e.g., palladium carbon, rhodium carbon and platinum carbon, metal powders, e.g., nickel and platinum, iodine, and iodides, e.g., iron iodide are exemplified.

The rosin for use in the exemplary embodiment may be a hydrogenated rosin for the purpose of eliminating unstable conjugated double bonds. Concerning the hydrogenation reaction, known hydrogenation reaction conditions are selected. The hydrogenation reaction is performed by heating a rosin in the presence of a hydrogenation catalyst under a hydrogen pressure. The hydrogenation catalyst may be any of those known in the art, for example, supported catalysts, e.g., palladium carbon, rhodium carbon and platinum carbon, metal powders, e.g., nickel and platinum, iodine, and iodides, e.g., iron iodide are exemplified.

The disproportionated rosins and hydrogenated rosins may be purified by providing the purification process as described above before or after disproportionation treatment and hydrogenation treatment.

On the other hand, the difunctional epoxy compound is a difunctional epoxy compound containing two epoxy groups in one molecule, and diglycidyl ethers of aromatic diols, diglycidyl ethers of aromatic dicarboxylic acids, diglycidyl ethers of aliphatic diols, diglycidyl ethers of alicyclic diols, and alicyclic epoxides are exemplified.

Representative examples of the diglycidyl ethers of aromatic diols include diglycidyl ethers of bisphenol A, derivatives of bisphenol A, such as polyalkylene oxide adducts of bisphenol A, bisphenol F, derivatives of bisphenol F, such as polyalkylene oxide adducts of bisphenol F, bisphenol S, derivatives of bisphenol S, such as polyalkylene oxide adducts of bisphenol S, resorcinol, t-butylcatechol, and biphenols as aromatic diol components.

Representative examples of the diglycidyl ethers of aromatic dicarboxylic acids include diglycidyl ethers of terephthalic acid, isophthalic acid and phthalic acid as aromatic dicarboxylic acid components.

Representative examples of the diglycidyl ethers of aliphatic diols include diglycidyl ethers of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol as aliphatic diol components.

Representative examples of the diglycidyl ethers of alicyclic diols include diglycidyl ethers of hydrogenated bisphenol A, derivatives of hydrogenated bisphenol A, such as polyalkylene oxide adducts of hydrogenated bisphenol A, and cyclohexanedimethanol as alicyclic diol components.

Representative examples of the alicyclic epoxides include limonene dioxide.

The difunctional epoxy compound can be obtained, for example, by the reaction of a diol component and epihalohydrin. A higher molecular weight of the difunctional epoxy compound can be accomplished by polycondensation depending upon the ratio of the diol component to the epihalohydrin.

The exemplary compounds of the specific rosin diols represented by formula (1) are shown below, but the invention is not restricted thereto.

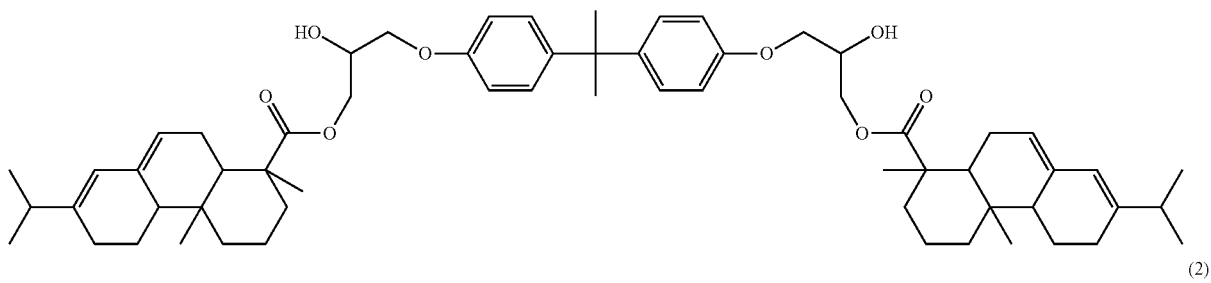

(1)

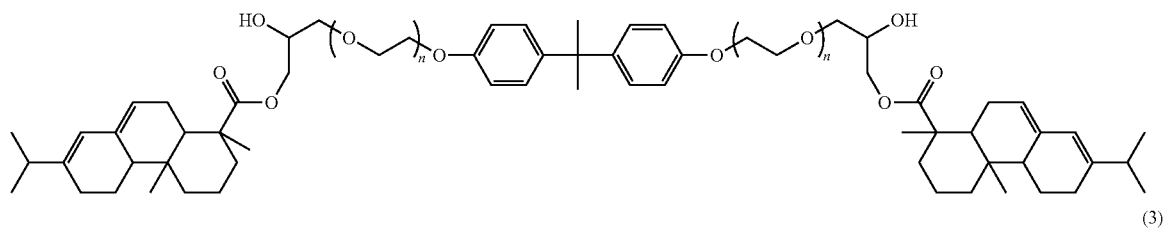

(2)

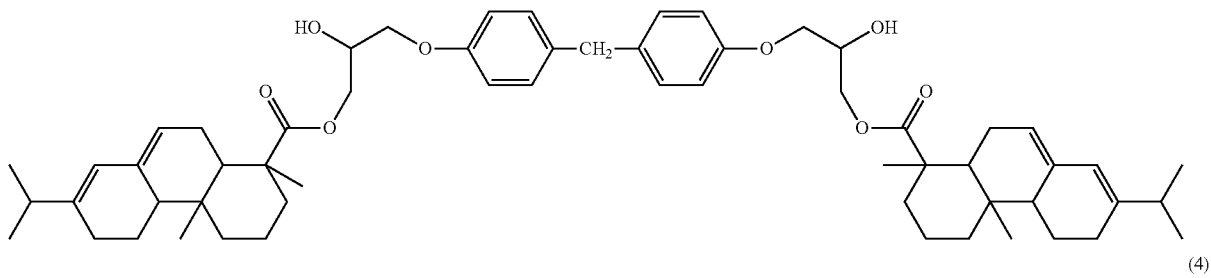

(3)

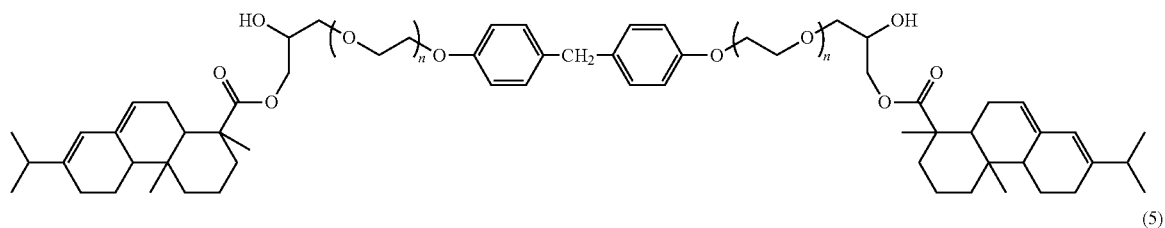

(4)

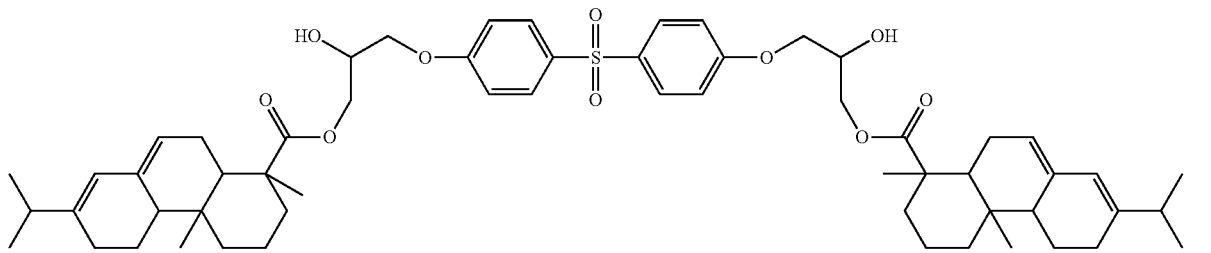

(5)

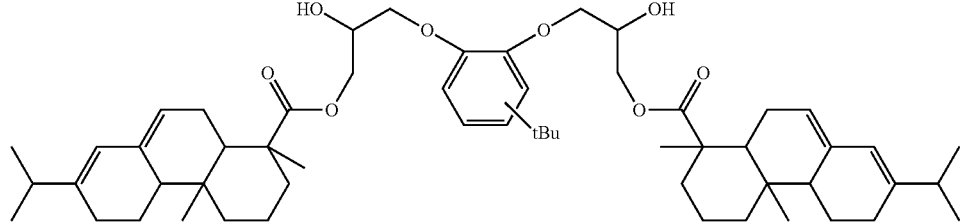
(6)
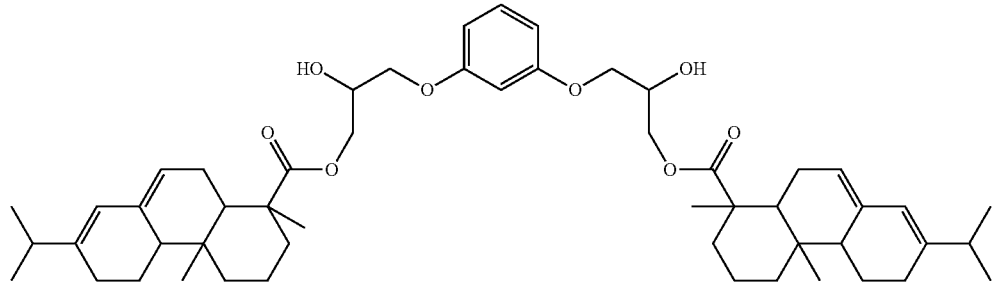
(7)
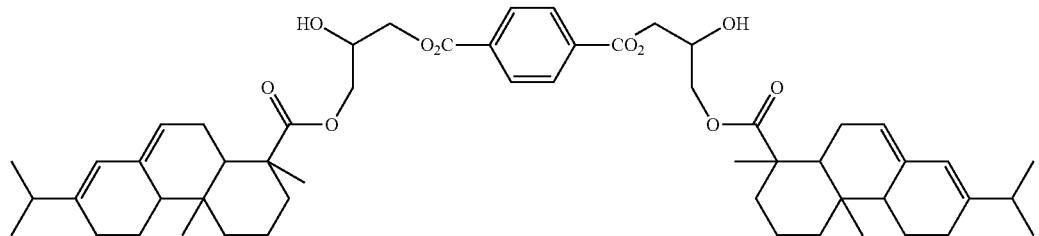
(8)
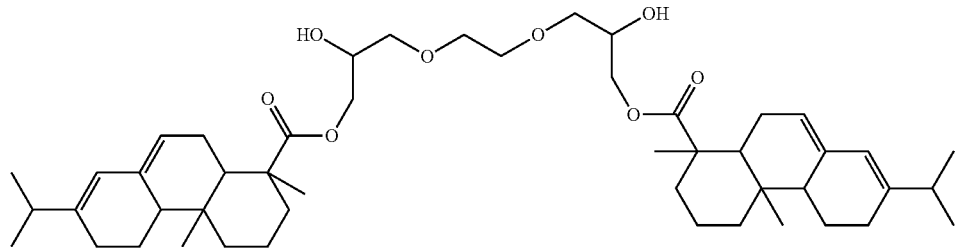
(9)
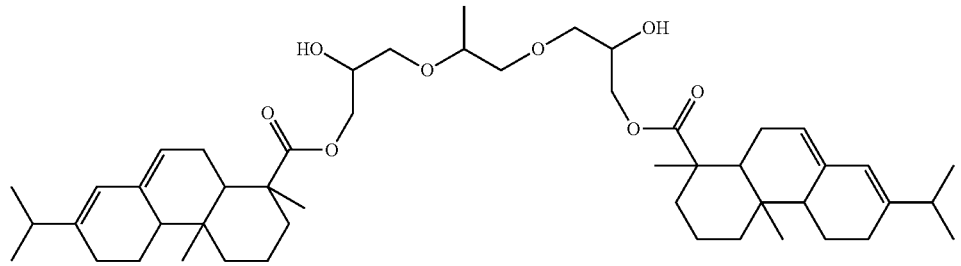
(10)
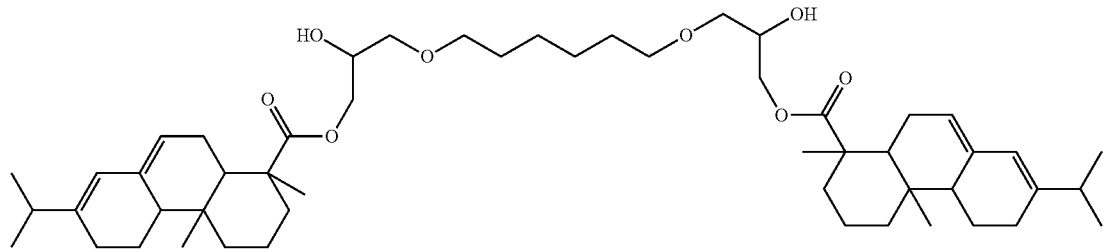
(12)

-continued
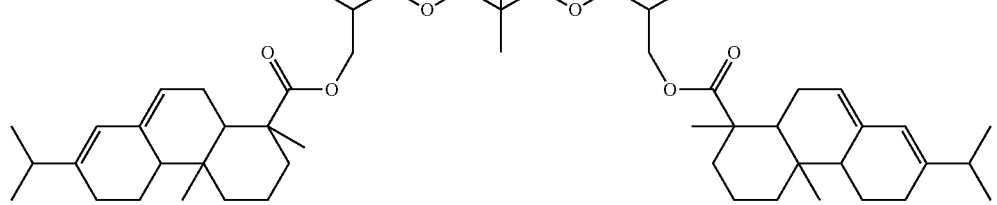
(13)
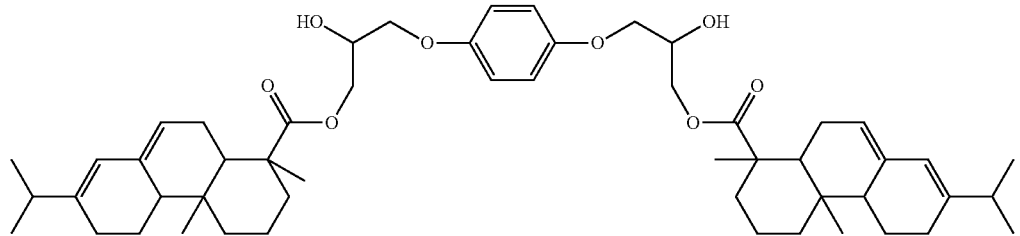
(13-1)
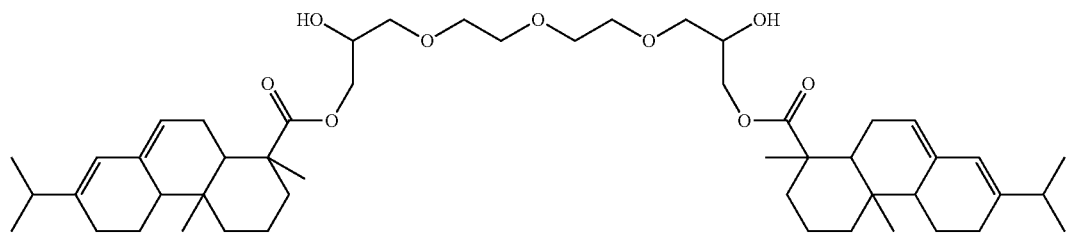
(14)
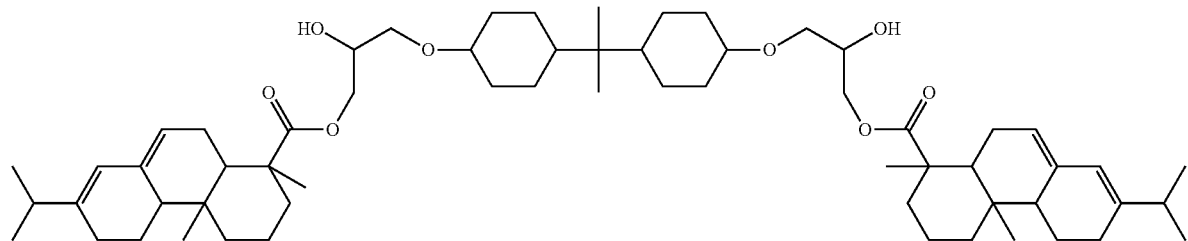
(15)
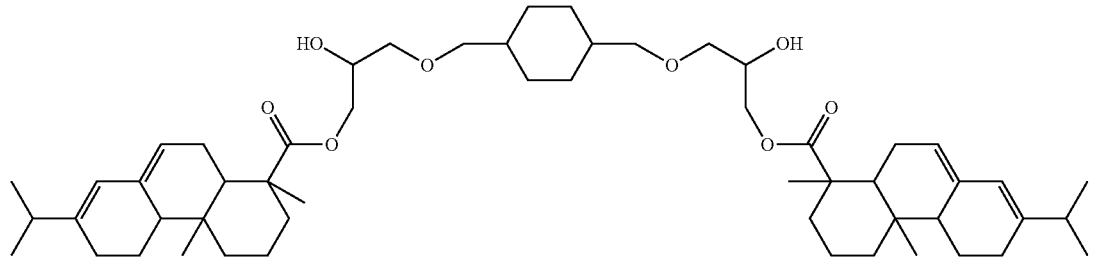
(16)
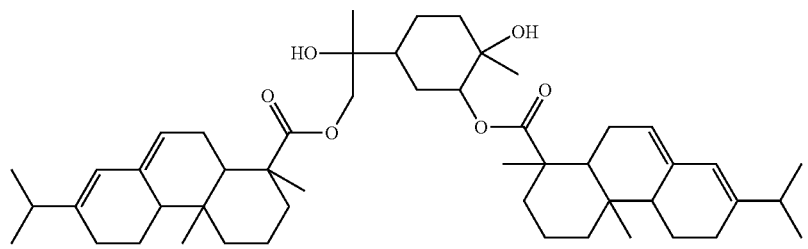
(17)

-continued
(18)
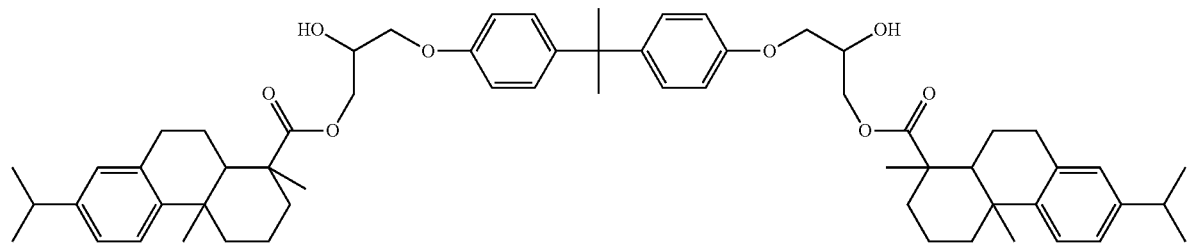
(19)
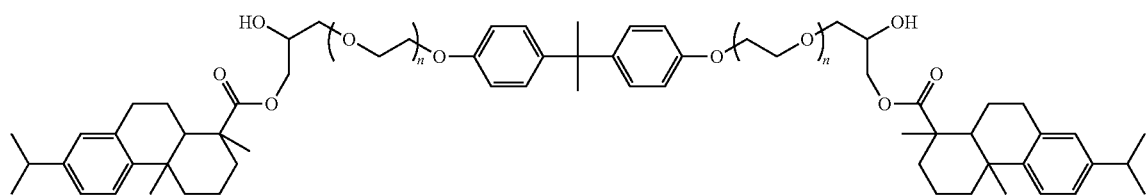
(20)
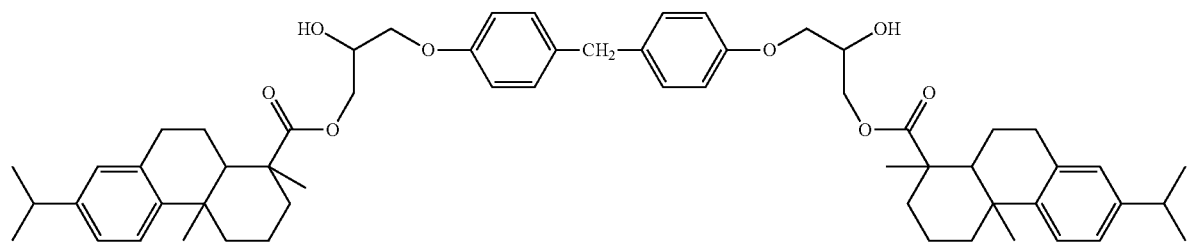
(21)
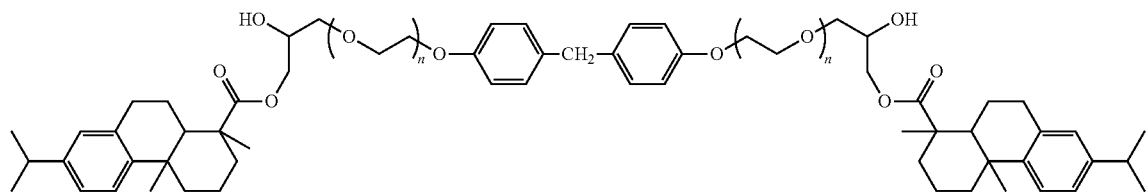
(22)
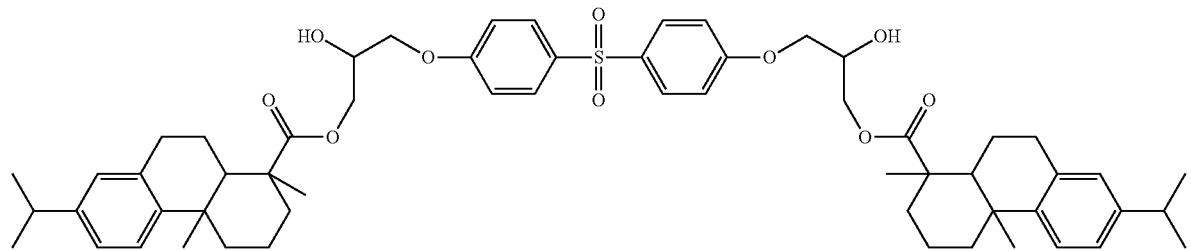
(23)
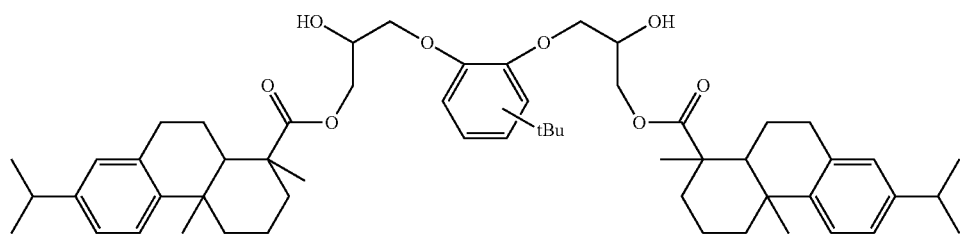

-continued
(24)
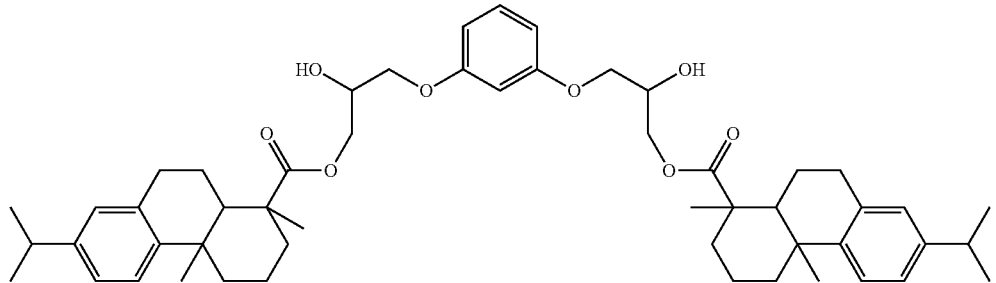
(25)
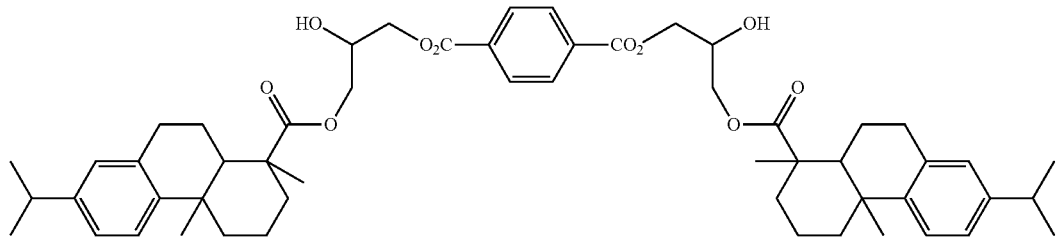
(26)
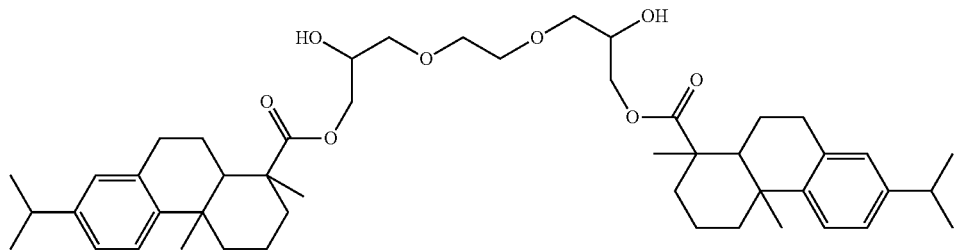
(27)
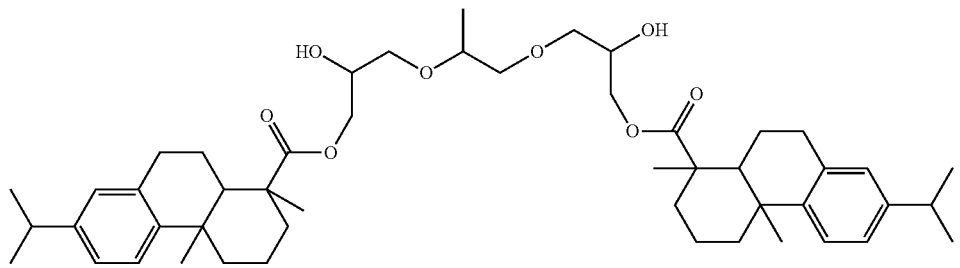
(28)
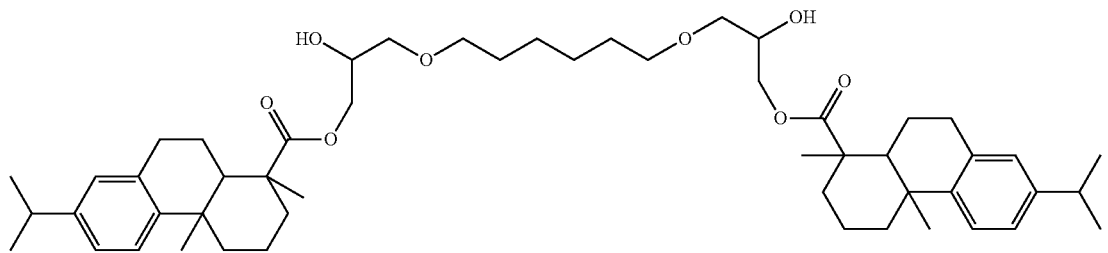
(29)
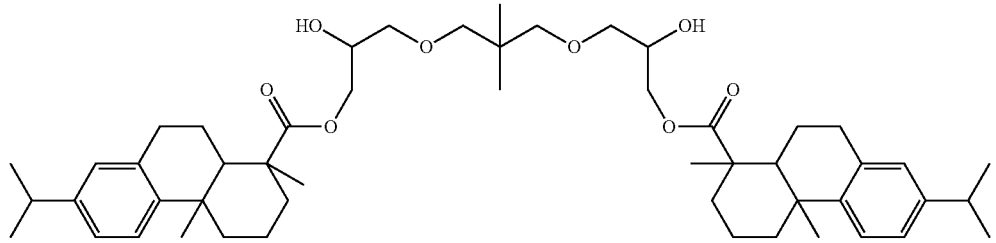

-continued
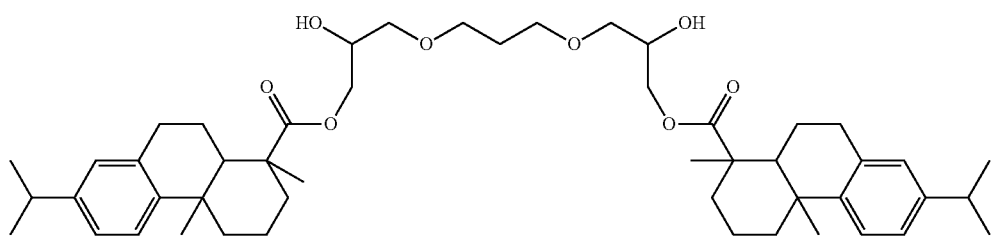
(30)
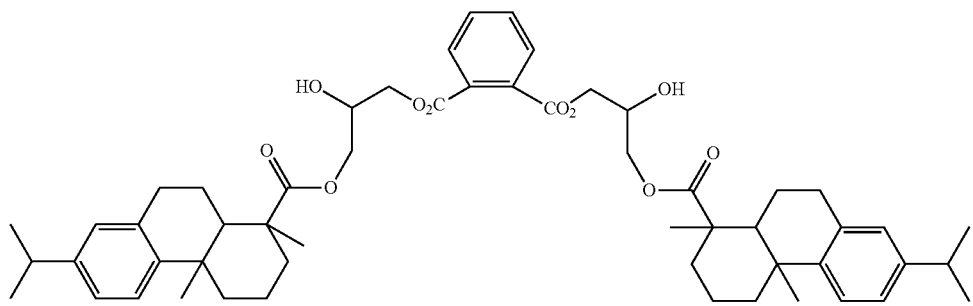
(31)
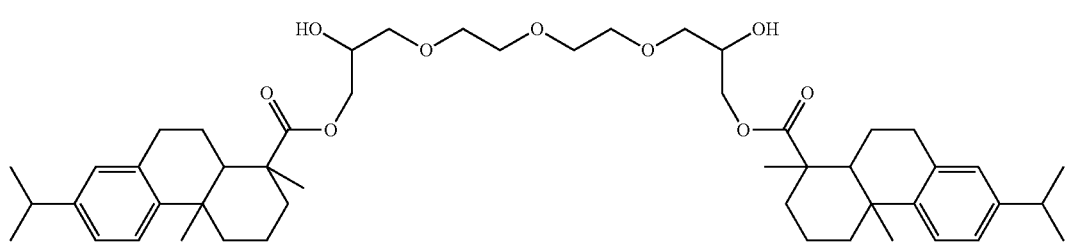
(32)
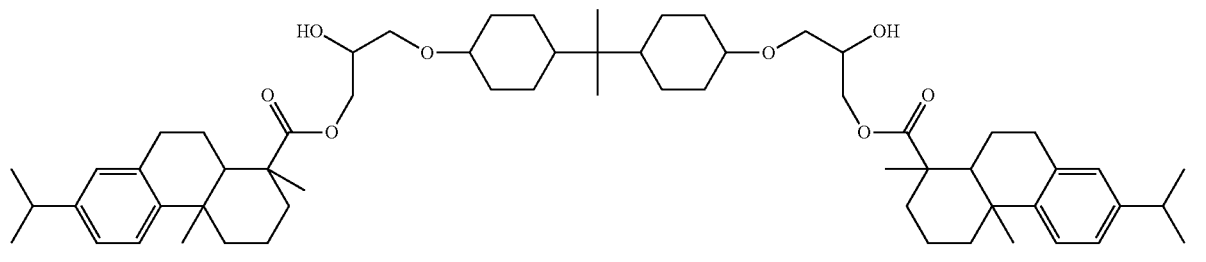
(33)
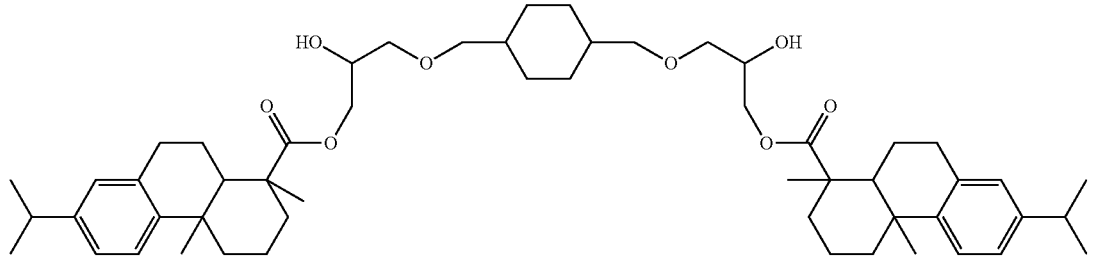
(34)
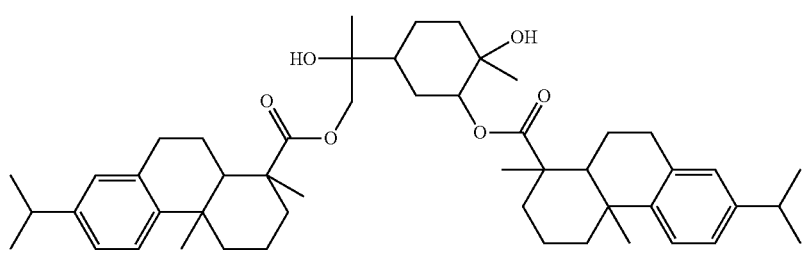
(35)

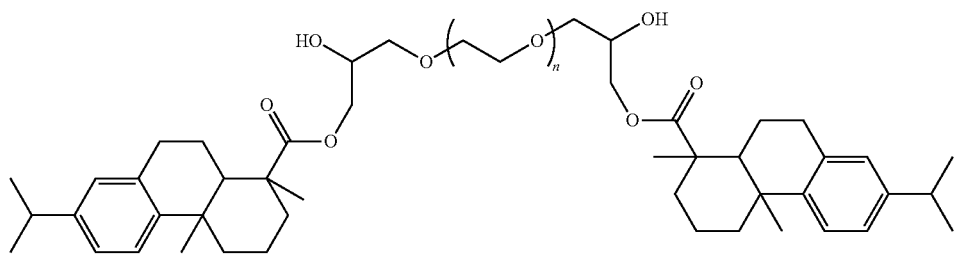
(36)
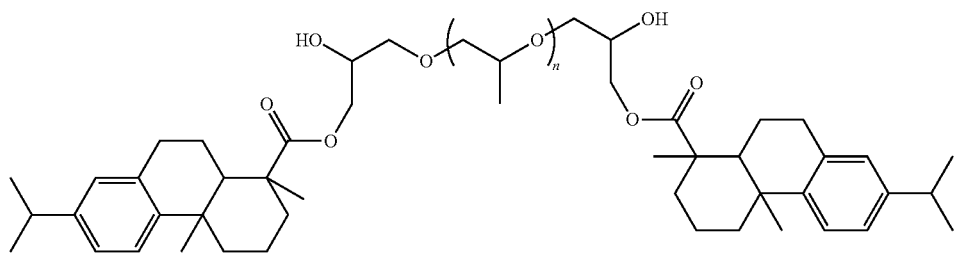
(37)
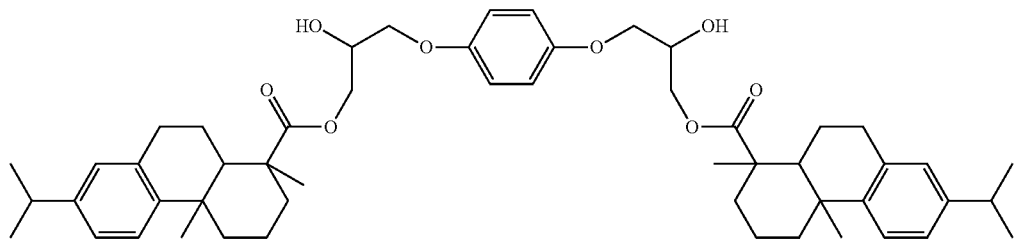
(37-1)
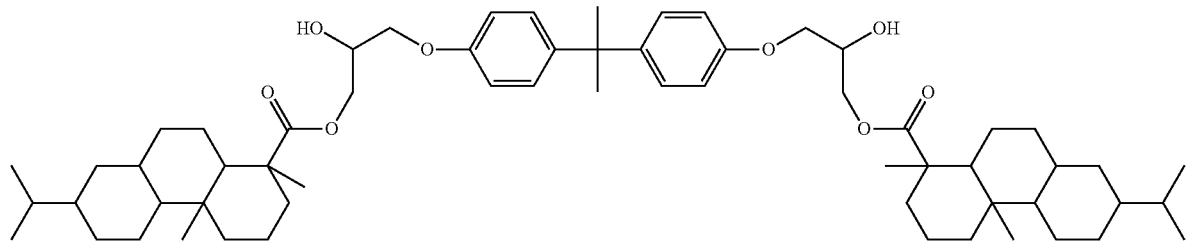
(38)
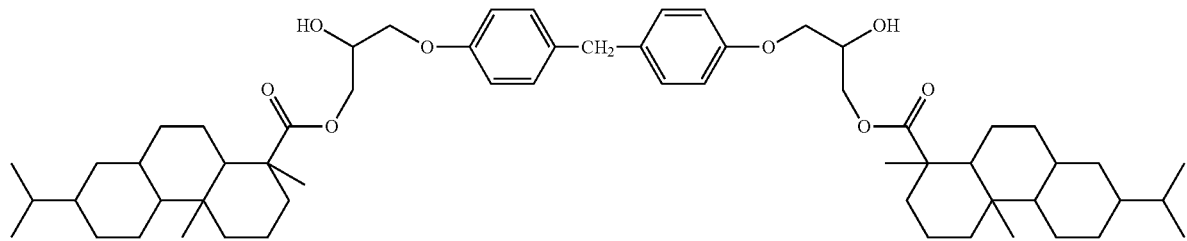
(39)
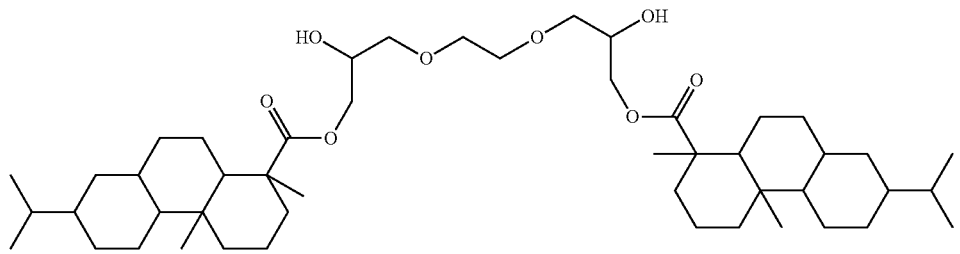
(40)

(41)

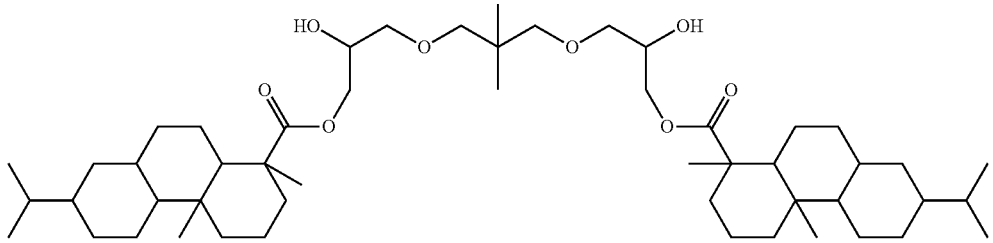

(42)

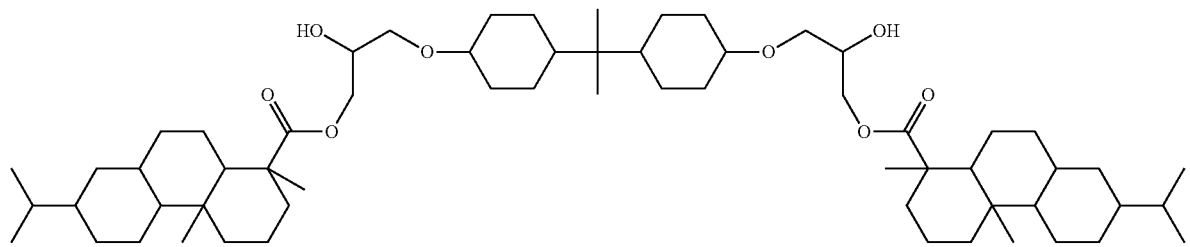

(42-1)

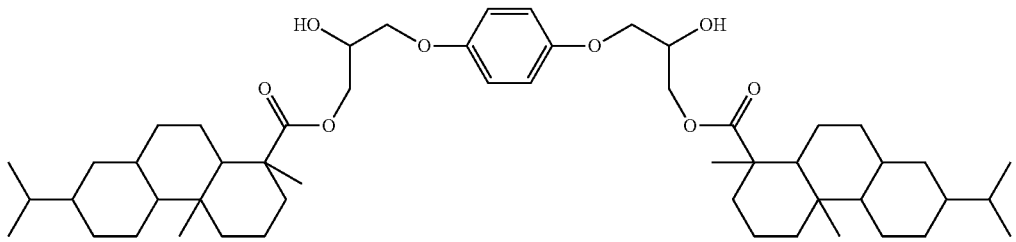

In the exemplified compounds of the specific rosin diols, each n represents an integer of 1 or more.

As the dialcohol component, dialcohol components other than the specific rosin diols may be used in combination. The content of the specific rosin diol is preferably from 10 mol % to 100 mol % in the dialcohol components in terms of charging property, and more preferably from 20 mol % to 90 mol %.

As the alcohol components other than the specific rosin diols, at least one selected from the group consisting of aliphatic diols and etherified diphenols may be used so long as toner performance is not impaired.

The examples of the aliphatic diols include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl-3-hydroxy-2,2-dimethylpropanoate, diethylene glycol, triethylene glycol, polyethylene glycol, dipropylene glycol, and polypropylene glycol. These aliphatic diols may be used alone, or in combination of two or more kinds.

Further, an etherified diphenol may further be used together with the aliphatic diol. The etherified diphenol is a diol obtained by addition reaction of bisphenol A and an alkylene oxide. The alkylene oxide is an ethylene oxide or a propylene oxide. The average addition mol number of the alkylene oxide is preferably from 2 mol to 16 mol per mol of the bisphenol A.

The first polyester resin is prepared by any of known methods with the carboxylic acid component and alcohol component as raw materials. Either ester exchange reaction or direct esterification reaction may be applied to the reaction method. Polycondensation may be accelerated by increasing the reaction temperature under pressure or flowing inert gas under reduced pressure or normal pressure. Depending upon the reaction conditions, a reaction catalyst may be used to accelerate the reaction. The reaction catalyst may be any of those known in the art, i.e., the reaction catalyst may be a compound of at least one metal selected from antimony, titanium, tin, zinc, aluminum and manganese. The addition amount of the reaction catalyst is preferably from 0.01 parts by mass to 1.5 parts by mass based on the gross of 100 parts by mass of the acid component and the alcohol component, and more preferably from 0.05 parts by mass to 1.0 part by mass. The reaction is performed at a temperature of, for example, from 180° C. to 300° C.

An example of the synthetic scheme of the first polyester resin is shown below. In the following synthetic scheme, a difunctional epoxy compound is reacted with a rosin to synthesize a specific rosin diol, and the specific rosin diol and a dicarboxylic acid component are subjected to dehydration polycondensation to thereby synthesize the first polyester resin. In the structural formula representing the first polyester resin, the portion surrounded by the dashed line corresponds to the rosin ester group.

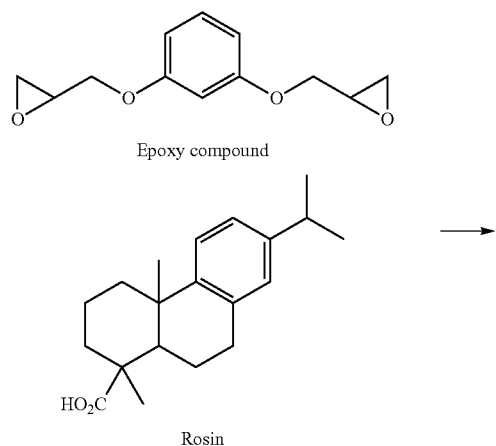
Epoxy compound
Rosin
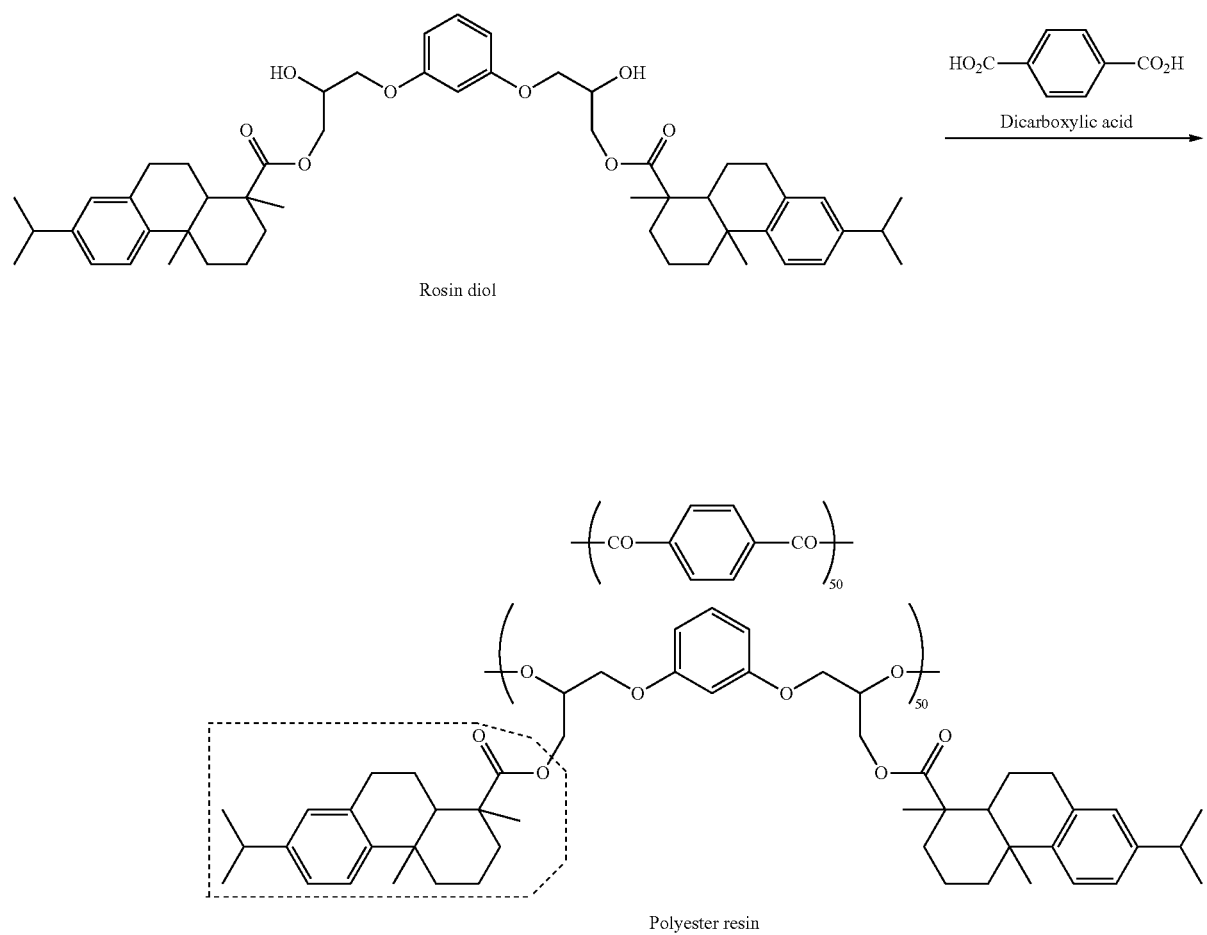
Rosin diol
Dicarboxylic acid
Polyester resin
Incidentally, hydrolysis of the first polyester resin results in the following monomers. Since the polyester resin is a condensation product of 1/1 of a dicarboxylic acid and a diol, the constituent components of the resin is estimated from the decomposed products.

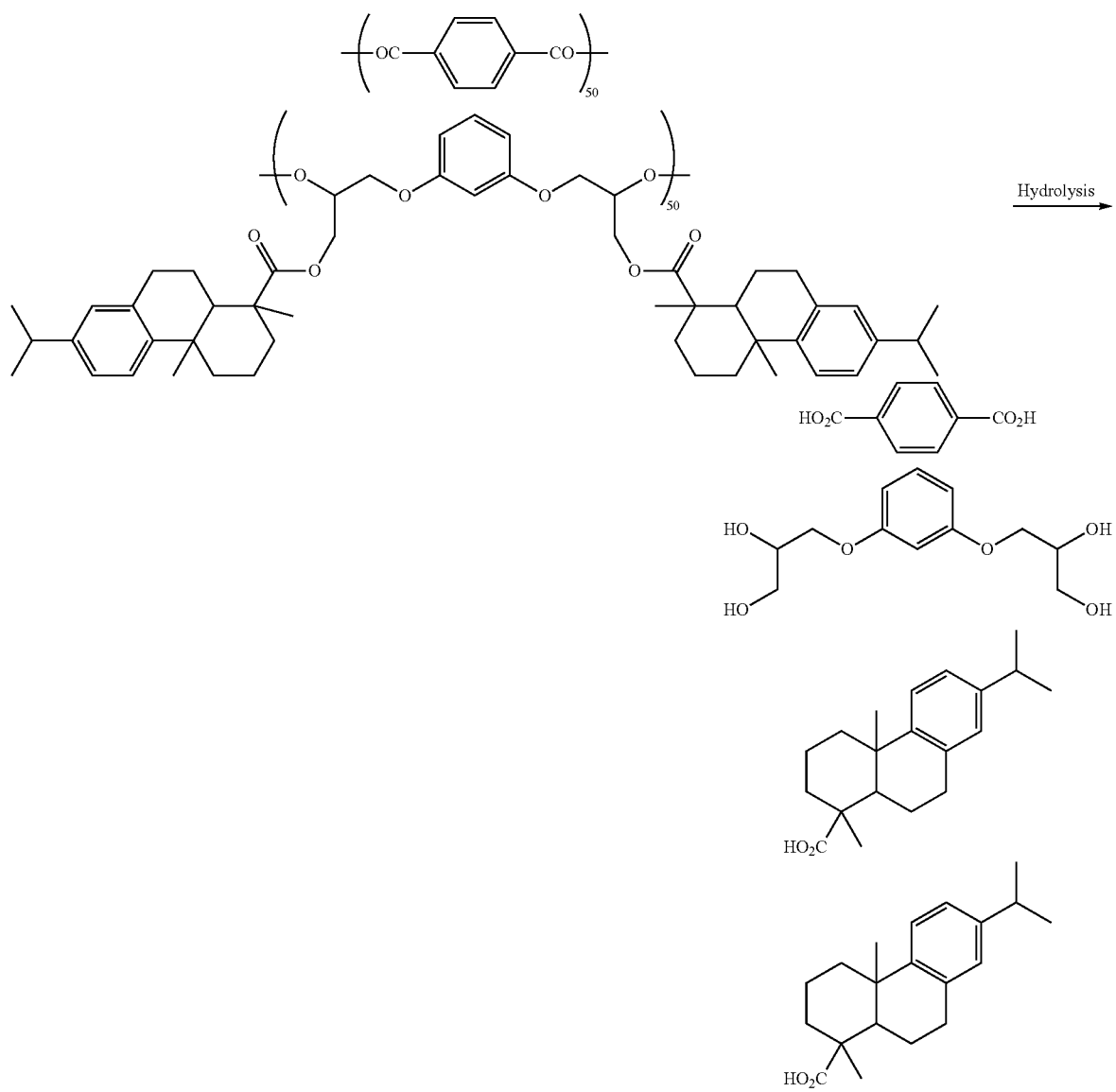

The weight average molecular weight of the first polyester resin is preferably 5,000 to 200,000 or from about 5,000 to 200,000, more preferably 10,000 to 150,000 or about 10,000 to about 150,000, and still more preferably from 15,000 to 100,000 or from about 15,000 to about 100,000.

By bringing the weight average molecular weight of the first polyester resin into the above range, a fixed image having high image strength is liable to be obtained.

The weight average molecular weight of a resin is measured with two lines of "HLC-8120GPC, SC-8020 (6.0 mm ID×15 cm, manufactured by Tosoh Corporation)" and tetrahydrofuran (THF) as the eluting solution. The experiment is performed with an RI detector under the following condition:
Concentration of the sample: 0.5%
Flow rate: 0.6 ml/min
Sample injection amount: 10 μl
Temperature of measurement: 40° C.
Calibration curves are plotted using ten samples of "polystyrene standard samples (TSK standard)": "A-500", "F-1", "F-10", "F-80", "F-380", "A-2500", "F-4", "F-40", "F-128" and "F-700" (manufactured by Tosoh Corporation).

The softening temperature of the first polyester resin is preferably from 80° C. to 160° C. from the point of fixing property, storage stability and durability, and is more preferably from 90° C. to 150° C.

A sample (1 cm$^3$) is melt and is allowed to flow out using a flow tester (CFT-500, manufactured by Shimadzu Corporation) under the following conditions: dice pore diameter=0.5 mm, pressure load=0.98 MPa (10 Kg/cm$^2$), heating rate=1° C./min. A temperature corresponding to a half of the height between the starting temperature and the end temperature of the outflow is defined as the softening temperature.

The glass transition temperature of the first polyester resin is preferably from 35° C. to 80° C. from the point of fixing property, storage stability and durability, and is more preferably from 40° C. to 70° C. The softening temperature and the glass transition temperature can be easily regulated by the adjustment of the compositions of the material monomers, polymerization initiators, molecular weights, and the amounts of catalysts, or by the selection of the reaction conditions.

The glass transition temperature is measured using DSC-20 (manufactured by SEICO Electronics industrial Co., Ltd.) while heating 10 mg of a sample at a constant rate of 10° C./min.

The acid value of the first polyester resin is preferably from 1 mg KOH/g to 50 mg KOH/g from the viewpoint of the charging property of the toner, and more preferably from 3 mg KOH/g to 30 mg KOH/g.

The acid value is measured by neutralization titration in accordance with JIS K0070. Specifically, 100 ml of a mixed solvent of diethyl ether and ethanol and drops of phenolphthalein as an indicator are added to an appropriate amount of a sample and the resulting mixture is sufficiently stirred in a water bath until the sample is completely dissolved. The solution is titrated with a 0.1 mol/l ethanolic solution of potassium hydroxide. The time when pale red of the indicator is observed for 30 sec is defined as the endpoint. The acid value A is calculated by $A=(B \times f \times 5.611)/S$ where S is the sample amount (g), B is the volume (ml) of the 0.1 mol/l ethanolic solution of potassium hydroxide, and f is the factor of the 0.1 mol/l ethanolic solution of potassium hydroxide.

The content of the first polyester resin is preferably 70 parts by mass or more based on 100 parts by mass of the binder resins in total, and more preferably 90 parts by mass or more.

—Second Polyester Resin—

The second polyester resin is an amorphous or crystalline polyester resin.

The second polyester resin has the difference (absolute value) in the parameter of solubility relative to the first polyester resin of from 0.3 $(cal/cm^3)^{1/2}$ to 3 $(cal/cm^3)^{1/2}$, preferably from 0.3 $(cal/cm^3)^{1/2}$ to 2 $(cal/cm^3)^{1/2}$, and more preferably from 0.3 $(cal/cm^3)^{1/2}$ to 1.5 $(cal/cm^3)^{1/2}$.

That is, the difference (absolute value) between the parameter of solubility of the first polyester resin and the parameter of solubility of the second polyester resin is in the above range.

By bringing the difference in the parameters in the above range, it is presumed that the second polyester resin easily entangles the stiff main chain of the amorphous first polyester resin and, as a result, the strength of the fixed image is improved.

The solubility parameter (SP value), which is the index of the compatibility of resins, is computed by the method of Fedor.

Specifically, the computation is described in detail in Polym. Eng. Sci., Vol. 14, p. 147 (1974), and SP value is computed by the following expression:

$$SP\text{value}=\sqrt{(Ev/v)}=\sqrt{(\Sigma\Delta ei/\Sigma\Delta vi)}$$

(wherein Ev: evaporation energy (cal/mol), v: molar volume ($cm^3$/mol), $\Delta ei$: evaporation energy of each atom or atomic group, and $\Delta vi$: molar volume of each atom or atomic group)

The solubility parameter of each resin is adjusted by, for example, 1) a method of copolymerizing a long chain alkyl monomer, 2) a method of copolymerizing a monomer having an ionic functional group, and 3) a method of adjusting the ester group concentration.

As the second polyester resin, in addition to amorphous and crystalline polyester resins, condensation polymerization products of known polyvalent carboxylic acids and polyhydric alcohols are exemplified.

The second polyester resin is preferably a crystalline polyester resin, especially from the viewpoint of capable of realizing a low temperature fixing property, condensation polymerization products of an aliphatic dicarboxylic acid (including acid anhydrides and acid chlorides thereof) and an aliphatic diol are preferred.

The examples of the aliphatic diols include, for example, ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexanediol, 1,4-cyclohexanediol, 1,4-cyclohexanedimethanol, dipropylene glycol, polyethylene glycol, polypropylene glycol, polytetramethylene glycol, bisphenol A, bisphenol Z, and hydrogenated bisphenol A.

The examples of the aliphatic dicarboxylic acids include, for example, oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconic acid, n-dodecylsuccinic acid, n-dodecenylsuccinic acid, isododecylsuccinic acid, isododecenylsuccinic acid, n-octylsuccinic acid, n-octenylsuccinic acid, and acid anhydrides and acid chlorides of these acids.

In particular, as the crystalline second polyester resins, a polyester resin of a condensation polymerization product of 1,4-cyclohexanedimethanol and adipic acid, a polyester of a condensation polymerization product of 1,6-hexanediol and sebacic acid, a polyester of a condensation polymerization product of ethylene glycol and succinic acid, a polyester of a condensation polymerization product of ethylene glycol and sebacic acid, and a polyester of a condensation polymerization product of 1,4-butanediol and succinic acid are exemplified, and a polyester of a condensation polymerization product of 1,4-cyclohexanedimethanol and adipic acid is preferred of these polyester resins.

As the crystalline second polyester resins, a polyester of a condensation polymerization product of 1,10-decanediol and sebacic acid, and a polyester of a condensation polymerization product of 1,9-nonanediol and dodecanoic diacid are also preferably exemplified, and a polyester obtained by the reaction of 1,9-nonanediol and dodecanoic diacid is most preferred of these polyesters.

The weight average molecular weight of the second polyester resin is preferably from 5,000 to 50,000, and more preferably from 10,000 to 20,000.

When the second polyester resin is a crystalline resin, the melting temperature of the resin is preferably from 50° C. to 100° C., and is more preferably from 60° C. to 80° C.

The melting temperature is a value found as the peak temperature of the endothermic peak obtained by differential scanning calorimetry (DSC) above. There are cases where a crystalline polyester resin shows a plurality of melting peaks, but the largest peak is taken as the melting temperature in the exemplary embodiment.

The content of the second polyester resin is preferably from 1 part by mass to 20 parts by mass on the basis of 100 parts by mass of the binder resins in total, and is more preferably from 5 parts by mass to 15 parts by mass.

The content of the second polyester resin in the mass ratio to the first polyester resin (second polyester resin/first polyester resin) is preferably from 0.01 to 0.25, and is more preferably from 0.05 to 0.18.

—Other Binder Resins—

Other resins, for example, known binder resins, e.g., vinyl-based resins such as a styrene-acryl resin, an epoxy resin, a polycarbonate resin, and a polyurethane resin may be used in combination besides the first polyester resin and the second polyester resin, so long as the advantages of the exemplary embodiment are not impaired.

—Coloring Agent—

Coloring agents may be either dyes or pigments, but considering light fastness and water resisting property, pigments are preferred.

As the coloring agents, known pigments may be used, such as carbon black, Aniline Black, Aniline Blue, Calcoil Blue, Chromium Yellow, Ultramarine Blue, Du Pont Oil Red, Quinoline Yellow, Methylene Blue Chloride, Phthalocyanine Blue, Malachite Green Oxalate, Lamp Black, Rose Bengal, Quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3.

As the coloring agents, surface-treated coloring agents and pigment dispersing agents may be used according to necessity.

By selecting the kinds of coloring agents, a yellow toner, a magenta toner, a cyan toner, and a black toner can be obtained.

The coloring agent is preferably used in an amount of from 1 part by mass to 30 parts by mass based on 100 parts by mass of the binder resin.

—Release Agent—

As release agents, paraffin waxes, e.g., low molecular weight polypropylene and low molecular weight polyethylene; silicone resins; rosins; rice waxes; and carnauba waxes are exemplified. The melting temperature of these release agents is preferably from 50° C. to 100° C., and is more preferably from 60° C. to 95° C. The content of the release agent in the toner is preferably from 0.5% by mass to 15% by mass, and is more preferably from 1.0% by mass to 12% by mass. When the content of the release agent is 0.5% by mass or more, peeling failure is prevented from occurring in particular in oilless fixing. While when the content of the release agent is 15% by mass or less, the flowing property of the toner is not deteriorated, and image quality and confidence in image formation is improved.

—Other Additives—

As a charge controlling agent, those known in the art may be used, but an azo-based metal complex compound, a metal complex compound of a salicylic acid, and a polar group-containing resin type charge controlling agent may be used.

—Characteristics of Toner Particles—

A toner particle may be a single layer structural particle, or may be what is called a core-shell structural particle composed of a core part (a core particle) and a covering layer (a shell layer) for covering the core part.

It is preferred for the core-shell structural toner particles to be composed of, for example, a core part containing a binder resin (a first polyester resin and a second polyester resin) and, if necessary, a coloring agent, a release agent, and other additives, and a covering layer containing a binder resin (a first polyester resin).

The volume average particle diameter of the toner particles is preferably from 2.0 µm to 10 µm, and preferably from 3.5 µm to 7.0 µm.

The volume average particle diameter of the toner particles is measured as follows. A measuring sample of 0.5 mg or more and 50 mg or less is added to a surfactant as a dispersing agent, preferably 2 ml of an aqueous solution of 5% by mass of sodium alkylbenzenesulfonate, which is added to 100 ml or more and 150 ml or less of the electrolyte. The electrolyte in which the measuring sample is suspended is subjected to dispersion treatment with an ultrasonic disperser for about 1 minute. The particle size distribution of the particles in the range of a particle size of 2.0 µm or more and 60 µm or less is measured with Coulter Multisizer II type (manufactured by Beckman Coulter, Inc.) by using the aperture having a diameter of 100 µm. The number of measured particles is 50,000.

The obtained particle size distribution data are plotted relative to the divided particle size ranges (channels) to draw the volume cumulative distribution from the particles having a smaller particle size, and the cumulative volume particle size giving accumulation of 50% is defined as $D50_v$.

The shape factor of the toner SF1 is, for example, preferably from 110 to 150, and is more preferably from 120 to 140.

The shape factor SF1 is found by the following equation (1).

$$SF1 = \frac{(ML)^2}{A} \times \frac{\pi}{4} \times 100 \qquad (1)$$

In equation (1), ML represents the absolute maximum length, and A represents a projected area.

SF1 is numerized primarily by analyzing a microscope image or a scanning electron microscope (SEM) image with an image analyzer and, for example, computed as follows. That is, the optical microscope image of the toner particles dispersed on a slide glass is loaded into LUZEX image analyzer through a video camera. The maximum length and the projected area are measured for 100 particles, SF1 of each toner particle is computed according to the above equation (1), and the obtained values are averaged as shape factor SF1.

(External Additives)

As external additives, for example, inorganic particles are exemplified. The examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$ and $MgSO_4$.

The surface of inorganic particles as an external additive may be subjected to hydrophobitizing treatment in advance. In the hydrophobitizing treatment, for example, inorganic particles are immersed in a hydrophobitization treating agent. The hydrophobitizing treatment is not especially restricted and, for example, a silane coupling agent, silicone oil, a titanate coupling agent, and an aluminum coupling agent are exemplified as the treating agents. These agents may be used alone or two or more in combination.

The amount of the hydrophobitization treating agent is generally from about 1 part by mass to about 10 parts by mass based on 100 parts by mass of the inorganic particles.

As external additives, resin particles (resin particles of polystyrene, PMMA, melamine resin, and the like), and cleaning activators (e.g., metal salts of higher fatty acids represented by zinc stearate, particle powder of a fluorinated polymer) are also exemplified.

The amount to be added of external additives is preferably from 0.01 parts by mass to 5 parts by mass, based on 100 parts by mass of the toner particles, and more preferably from 0.01 parts by mass to 2.0 parts by mass.

(Manufacturing Method of Toner)

The manufacturing method of the toner in the exemplary embodiment is described below.

Toner particles may be manufactured by any of dry manufacturing methods (e.g., a kneading pulverization method) and wet manufacturing methods (e.g., an aggregation coalescence method, a suspension polymerization method, a dissolution suspension granulation method, a dissolution suspension method, and a dissolution emulsification aggregation coalescence method). These manufacturing methods are not especially restricted and the methods known in the art are adopted.

An aggregation coalescence method is preferably used of these methods for obtaining the toner particles.

Specifically, for example, when toner particles are manufactured by an aggregation coalescence method, the toner particles are manufactured through a process of preparing first resin particle dispersion liquid wherein the amorphous first polyester resin particles (particles of the first polyester resin) are dispersed (a preparation process of resin particle dispersion liquid), a process of preparing second resin particle dispersion liquid wherein the second polyester resin particles (particles of the second polyester resin) are dispersed (a preparation process of resin particle dispersion liquid), a process of, after at least mixing the first resin particle dispersion liquid and the second resin particle dispersion liquid, aggregating the first polyester resin particles and the second polyester resin particles to form aggregated particles (a forming process of aggregated particles), and a process of forming the toner particles by heating the aggregated particle dispersion liquid wherein the aggregated particles are dispersed, fusing and coalescing the aggregated particles (a fusing and coalescing process).

Alternatively, toner particles may be manufactured through a process of forming the second aggregated particles by, after obtaining the aggregated particle dispersion liquid wherein the aggregated particles are dispersed, mixing the aggregated particle dispersion liquid and the first resin particle dispersion liquid wherein the amorphous first polyester resin particles (particles of the first polyester resin) are dispersed, and aggregating the particles so that the first polyester resin particles are further adhered to the surfaces of the aggregated particles, and a process of forming core-shell structural toner particles by heating the second aggregated particle dispersion liquid wherein the aggregated particles are dispersed to fuse and coalesce the second aggregated particles.

Each process is described in detail below.

Incidentally, a method for obtaining the toner particles containing a coloring agent and a release agent is described in the following, but a coloring agent and a release agent are those used according to necessity. Additives other than a coloring agent and a release agent may be used as a matter of course.

—Preparation Process of Resin Particle Dispersion Liquid—

In the first place, for example, coloring agent particle dispersion liquid wherein coloring agent particles are dispersed and release agent particle dispersion liquid wherein release agent particles are dispersed are prepared together with the first resin particle dispersion liquid wherein the first polyester resin particles are dispersed and the second resin particle dispersion liquid wherein the second polyester resin particles are dispersed.

Here, the resin particle dispersion liquids (the first resin particle dispersion liquid and the second resin particle dispersion liquid) are prepared by dispersing polyester resin particles (the first polyester resin particles and the second polyester resin particles) in a dispersion medium by a surfactant.

As the dispersion medium for use in resin particle dispersion, for example, an aqueous medium is exemplified.

As the aqueous medium, water, e.g., distilled water and ion exchange water, and alcohols are exemplified. These aqueous media may be used alone, or two or more kinds may be used in combination.

Surfactants are not especially restricted, and for example, anionic surfactants, such as sulfuric ester-based, sulfonic ester-based, phosphoric ester-based, and soap-based surfactants; cationic surfactants, such as amine salt type and quaternary ammonium salt type; and nonionic surfactants, such as polyethylene glycol-based, alkylphenol ethylene oxide adduct-based, and polyhydric alcohol-based surfactants are exemplified. Of these surfactants, anionic surfactants and cationic surfactants are especially preferably exemplified. Nonionic surfactants may be used in combination with anionic surfactants and cationic surfactants.

Surfactants may be used one kind alone, or two or more kinds may be used in combination.

For dispersing polyester resin particles in a dispersion medium in resin particle dispersion, ordinary dispersing methods using, for example, a rotary shearing-type homogenizer, a ball mill having media, a sand mill and a DYNO-MILL are exemplified. Depending upon the kind of resin particles to be used, resin particles may be dispersed in resin particle dispersion by using, for example, a phase reversal emulsification method.

The phase reversal emulsification method is a method of dispersing a resin in an aqueous medium in a particulate state by dissolving the resin to be dispersed in a hydrophobic organic solvent in which the resin is soluble, neutralizing the solution by adding a base to the organic continuous phase (O phase), and introducing an aqueous medium (W phase), to thereby reverse resin from W/O to O/W (what is called phase reversal of emulsion) to make a discontinuous phase.

As the volume average particle diameter of the polyester resin particles dispersed in resin particle dispersion, for example, the range of from 0.01 μm to 1 μm can be exemplified, it may be from 0.08 μm to 0.8 μm, or it may be from 0.1 μm to 0.6 μm.

The volume average particle diameter of polyester resin particles is measured with a laser diffraction system particle diameter distribution measuring instrument (LA-920, manufactured by Horiba, Ltd.). Hereinafter, the volume average particle diameter of particles is measured in the same manner unless otherwise indicated.

The content of polyester resin particles contained in resin particle dispersion is, for example, from 5% by mass to 50% by mass, and the content may be from 10% by mass to 40% by mass.

Coloring agent dispersion and release agent dispersion are also prepared in the same manner with the resin particle dispersion. That is, the volume average particle diameter of the particles in resin particle dispersion, the dispersion medium, the dispersing method, and the content of the particles are also the same with coloring agent particles dispersed in coloring agent dispersion and release agent particles dispersed in release agent dispersion.

—Forming Process of Aggregated Particles—

In the next place, the coloring agent particle dispersion liquid and the release agent particle dispersion liquid are mixed with the first resin particle dispersion liquid and the second resin particle dispersion liquid.

The first polyester resin particles, the second polyester resin particles, coloring agent particles and release agent particles are heterogeneously aggregated in the mixed dispersion liquid to form aggregated particles containing the first polyester resin particles, the second polyester resin particles, the coloring agent particles and the release agent particles having a particle size near to the particle size of the aiming toner particles.

Specifically, for example, a flocculating agent is added to the mixed dispersion and pH of the mixed dispersion is adjusted to acidic (for example, pH is from 2 to 5), and if necessary, after adding a dispersion stabilizer, the mixed dispersion is heated to the glass transition temperature of the first resin particles (specifically, for example, the glass transition temperature of the first polyester resin particles −30° C. or more and the glass transition temperature −10° C. or less), and the particles dispersed in the mixed dispersion are aggregated to form aggregated particles.

In the forming process of aggregated particles, for example, the flocculating agent may be added at room temperature (e.g., 25° C.) with stirring the mixed dispersion with a rotary shearing-type homogenizer, and pH of the mixed dispersion is adjusted to acidic (for example, pH is from 2 to 5), and if necessary, after adding a dispersion stabilizer, the mixed dispersion may be heated.

As flocculating agents, surfactants having reverse polarity to the surfactants used as the dispersants to be added to the mixed dispersion, for example, inorganic metal salts and divalent or higher metal complexes are exemplified. In particular, when a metal complex is used as the flocculating agent, the amount of the surfactant to be used is reduced and electrostatic properties is improved.

An additive forming a complex or simulated bonding with the metal ion of the flocculating agent may be used, if necessary. As such an additive, a chelating agent is preferably used.

The examples of the inorganic metal salts include metal salts, e.g., calcium chloride, calcium nitrate, barium chloride, magnesium chloride, zinc chloride, aluminum chloride, and aluminum sulfate, and inorganic metal salt polymers, e.g., aluminum polychloride, aluminum polyhydroxide, and calcium polysulfide.

As chelating agents, water-soluble chelating agents may be used. The examples of chelating agents include, for example, hydroxycarboxylic acid, e.g., tartaric acid, citric acid, and gluconic acid, iminodiacid (IDA), nitrilotriacetic acid (NTA), and ethylenediaminetetraacetic acid (EDTA).

The addition amount of chelating agent is, for example, from 0.01 parts by mass to 5.0 parts by mass based on 100 parts by mass of the resin particles, and the amount may be 0.1 parts by mass or more and less than 3.0 parts by mass.

—Fusing and Coalescence Process—

Next, the aggregated particle dispersion wherein the aggregated particles are dispersed is heated at a temperature equal to or higher than the glass transition temperature of the first polyester resin particles (for example, a temperature higher than the glass transition temperature of the first polyester resin particles by 10° C. to 30° C.) to thereby fuse and coalesce the aggregated particles and form toner particles.

Toner particles are obtained through the above-described processes.

After termination of fusing and coalescence process, the toner particles formed in the solution are subjected to known washing process, solid-liquid separating process and drying process, thus dried toner particles are obtained.

In the washing process, in consideration of charging property of the toner, it is preferred to perform sufficient displacement washing by ion exchange water. The solid-liquid separating process is not especially restricted, but in terms of productivity, suction filtration and pressure filtration are preferably used. Further, the drying process is not also particularly restricted, but from the point of productivity, freeze drying, flash jet drying, fluidized drying and vibrating type fluidized drying are preferably used.

The toner in the exemplary embodiment is manufactured, for example, by adding an external additive to the toner particles in the obtained dried state and mixing. Mixing is preferably performed with a V-type blender, a Henschel mixer, or a Roedige mixer. Further, if necessary, coarse particles of the toner may be removed with a vibration-type sieving machine or a window power sieving machine

[Electrostatic Image Developer]

The electrostatic image developer according to the exemplary embodiment contains at least the toner in the exemplary embodiment.

The electrostatic image developer in the exemplary embodiment may be a one-component developer containing the toner according to the exemplary embodiment alone or may be a two-component developer of the mixture of the toner in the exemplary embodiment and a carrier.

The carrier is not especially restricted and any of known carriers are used. The carrier may be, for example, a resin-coated carrier, a magnetic dispersion carrier, or a resin dispersion carrier.

The mixing ratio (mass ratio) of the toner in the exemplary embodiment to the carrier in the two-component developer is preferably in the range of toner/carrier of about 1/100 to about 30/100, and is more preferably in the range of about 3/100 to about 20/100.

[Image Forming Apparatus and Image Forming Method]

The image forming apparatus and image forming method in the exemplary embodiment will be described in the next place.

The image forming apparatus in the exemplary embodiment includes an image holding member, a charging unit for charging the surface of the image holding member, an electrostatic image forming unit for forming an electrostatic image on the surface of the charged image holding member, a developing unit containing the electrostatic image developer and forming a toner image by developing the electrostatic image formed on the image holding member with the electrostatic image developer, a transfer unit for transferring the toner image formed on the image holding member to a transfer-receiving member, and a fixing unit for fixing the toner image transferred to the transfer-receiving member. As the electrostatic image developer, the electrostatic image developer according to the exemplary embodiment is used.

In the image forming apparatus in the exemplary embodiment, a part including a developing unit may have a cartridge structure (a process cartridge) attachable to and detachable from the image forming apparatus. As the process cartridge, a process cartridge containing the electrostatic image developer according to the exemplary embodiment and having a developing unit is preferably used.

The image forming method in the exemplary embodiment has a charging process for charging the image holding member, an electrostatic image forming process for forming an electrostatic image on the surface of the charged image holding member, a developing process containing the electrostatic image developer and forming a toner image by developing the electrostatic image formed on the image holding member with the electrostatic image developer, a transfer process for transferring the toner image formed on the image holding member to a transfer receiving member, and a fixing process for fixing the toner image transferred to the transfer-receiving member, and the electrostatic image developer according to the exemplary embodiment is used as the electrostatic image developer.

An example of the image forming apparatus according to the exemplary embodiment will be described below, but the exemplary embodiment is not restricted thereto. Further, the main units of the image forming apparatus in the drawing will be explained and explanations of other units are omitted.

FIG. 1 is a schematic drawing showing a quadruple tandem type color image forming apparatus. The image forming apparatus shown in FIG. 1 includes first, second, third and fourth image forming units 10Y, 10M, 10C and 10K of electrophotographic mode outputting yellow (Y), magenta (M), cyan (C) and black (K) color images based on color-separated image data. These image forming unit (hereinafter sometimes referred to as merely "unit") 10Y, 10M, 10C and 10K are arranged in parallel at predetermined intervals in a horizontal direction. The units 10Y, 10M, 10C and 10K may be process cartridges attachable to and detachable from the main body of the image forming apparatus.

Intermediate transfer belt 20 as the intermediate transfer member is installed to run on top in FIG. 1 throughout units 10Y, 10M, 10C and 10K. Intermediate transfer belt 20 is installed to wind drive roller 22 and support roller 24 arranged at an interval in the direction from left to right as in FIG. 1 in contact with the inner side of intermediate transfer belt 20. Intermediate transfer belt 20 runs in the direction from the first unit 10Y toward the fourth unit 10K. Support roller 24 is pressed in the direction away from driving roller 22 by a spring (now shown). A tension is given on intermediate transfer belt 20 winding the two rollers. On the lateral of the image holding member of intermediate transfer belt 20, cleaning apparatus 30 for cleaning the intermediate transfer member is provided facing driving roller 22.

Developing apparatus (developing units) 4Y, 4M, 4C and 4K of units 10Y, 10M, 10C and 10K supply toners of four colors of yellow, magenta, cyan and black contained in toner cartridges 8Y, 8M, 8C and 8K, respectively.

Since four units 10Y, 10M, 10C and 10K have the same constitution, the explanation of the first unit 10Y for forming a yellow image, which is arranged upstream the running direction of the intermediate transfer belt, can be applied to other units. Explanations of units 10M, 10C and 10K are omitted by attaching the reference numbers with letters magenta (M), cyan (C) and black (K) to the corresponding parts to the part of first unit 10Y in place of yellow (Y).

The first unit 10Y has photoconductor 1Y acting as an image holding member. Roller 2Y for charging the surface of photoconductor 1Y with a predetermined potential, exposure apparatus 3 for exposing the charged surface of photoconductor 1Y with laser bean 3Y based on color-separated image signals to form an electrostatic image (an electrostatic image forming unit), developing apparatus (a developing unit) 4Y for feeding a charged toner to the electrostatic image to develop the electrostatic image, first transfer roller 5Y (first transfer unit) for transferring the developed toner image to intermediate transfer belt 20, and cleaning apparatus (a cleaning unit) 6Y for removing the toner remaining on the surface of photoconductor 1Y after first transfer are arranged around photoconductor 1Y.

The first transfer roller 5Y is arranged at the inner side of intermediate transfer belt 20 and is installed in a position facing photoconductor 1Y. A bias power source (not shown) is connected to each of first transfer rollers 5Y, 5M, 5C and 5K to apply first transfer bias. The transfer bias applied to each of the first transfer rollers from the bias power source is varied by a control unit (now shown).

Hereinafter, an explanation will be given concerning the forming operation of a yellow image in first unit 10Y. Prior to the operation, the surface of photoconductor 1Y is charged to a potential of −600 V to −800 V or so by roller 2Y.

Photoconductor 1Y is formed by laminating a photosensitive layer on a conductive base having a volume resistivity of $1 \times 10^{-6}$ Ωcm or less at 20° C. Although the resistance of the photosensitive layer is usually high (comparable to that of general resins), the resistivity of a part of the photosensitive layer irradiated with laser beam 3Y tends to vary. Depending upon yellow image data sent from a control unit (now shown), exposure apparatus 3 outputs laser beam 3Y to the surface of charged photoconductor 1Y. Laser beam 3Y is applied to the photosensitive layer on the surface of photoconductor 1Y to form an electrostatic image in a yellow printing pattern on the surface of photoconductor 1Y.

The electrostatic image is an image formed on the surface of photoconductor 1Y by charging. The electrostatic image is what is called a negative image formed because the resistivity of the irradiated part of the photosensitive layer decreases by irradiation with laser beam 3Y and electric charge on the surface of photoconductor 1Y flows, but electric charge remains on the part not irradiated with laser beam 3Y.

The electrostatic image thus formed on photoconductor 1Y is rotated to a predetermined development position according to running motion of photoconductor 1Y. At the development position, the electrostatic image on photoconductor 1Y is visualized as an image (a developed image) by developing apparatus 4Y.

The electrostatic image developer according to the exemplary embodiment containing at least a yellow toner and a carrier is housed in developing apparatus 4Y. The yellow toner is friction-charged by stirring in developing apparatus 4Y, possesses the same polarity (negative polarity) with the electrical charge charged on photoconductor 1Y and is retained on a developer roll (a developer holding member). When the surface of photoconductor 1Y passes through developing apparatus 4Y, the yellow toner is electrostatically attached to the antistatic image part on the surface of photoconductor 1Y, and the latent image is developed with the yellow toner. Photoconductor 1Y, on which the yellow toner image is formed, runs continuously at a predetermined speed to allow the toner image developed on photoconductor 1Y to be conveyed to a predetermined first transfer position.

When the yellow toner image on photoconductor 1Y is conveyed to the first transfer position, a first transfer bias is applied to first transfer roller 5Y to allow an electrostatic force directing toward first transfer roller 5Y from photoconductor 1Y to act on the toner image, and the toner image on photoconductor 1Y is transferred to intermediate transfer belt 20. The transfer bias applied at this time has a counter polarity (+) to the polarity of the toner (−). In first unit 10Y, for example, the applied transfer bias is controlled to +10 μA or so by a control unit (now shown).

The toner remaining on photoconductor 1Y is removed and collected by cleaning apparatus 6Y.

The first transfer biases applied to first transfer rollers 5M, 5C and 5K in the second unit 10M and after are also controlled in the same manner as in the first unit.

Intermediate transfer belt 20, to which the yellow toner image is transferred, is sequentially conveyed from the first unit 10Y to the second, third and fourth units 10M, 10C and 10K, and toner images of different colors are overlapped and multiplex-transferred.

Intermediate transfer belt 20, where the four toner images are multiplex-transferred through the first, second, third and fourth units, reaches a second transfer unit including intermediate transfer belt 20, support roller 24 in contact with the inner side of intermediate transfer belt 20, and second transfer roller 26 (a second transfer unit) arranged on the image holding surface side of intermediate transfer belt 20. Recording paper P (a transfer-receiving member) is fed at a predetermined timing into a gap between second transfer roller 26 and intermediate transfer belt 20, which are in contact with each other under pressure, through feeding mechanism and a second transfer bias is applied to support roller 24. The applied transfer bias has the same polarity (−) with the polarity (−) of the toner and an electrostatic force directing toward recording paper P from intermediate transfer belt 20 acts on the toner image to allow the toner image on intermediate transfer belt 20 to be transferred to recording paper P. The second transfer bias is determined depending upon the resistance of the second transfer unit which is detected by a detecting unit (now shown) to detect the resistance of the second transfer unit, and the voltage is controlled.

Thereafter, recording paper P is sent to a pressure contacting part (a nip part) of a pair of fixing rolls in fixing apparatus 28 (a fixing unit in a roll state), where the toner image is fixed onto recording paper P to form a fixed image.

As the transfer-receiving material to which a toner image is transferred, for example, plain paper for use in electrophotographic copiers and printers, and OHP sheet are exemplified.

For further improving smoothness of image surface after fixing, the surface of a transfer-receiving material is also preferably smooth, for example, coat paper obtained by coating the surface of plain paper with a resin or the like, and art paper for printing are preferably used.

After fixing of the color image is finished, recording paper P is conveyed to the discharge unit, and a series of color image forming operation is completed.

The above exemplified image forming apparatus has a constitution of transferring a toner image to recording paper P through intermediate transfer belt 20, but the exemplary embodiment is not restricted thereto. For example, the image forming apparatus may have such a constitution that a toner image is directly transferred from a photoconductor to a recording paper.

(Process Cartridge and Toner Cartridge)

Figure 2:
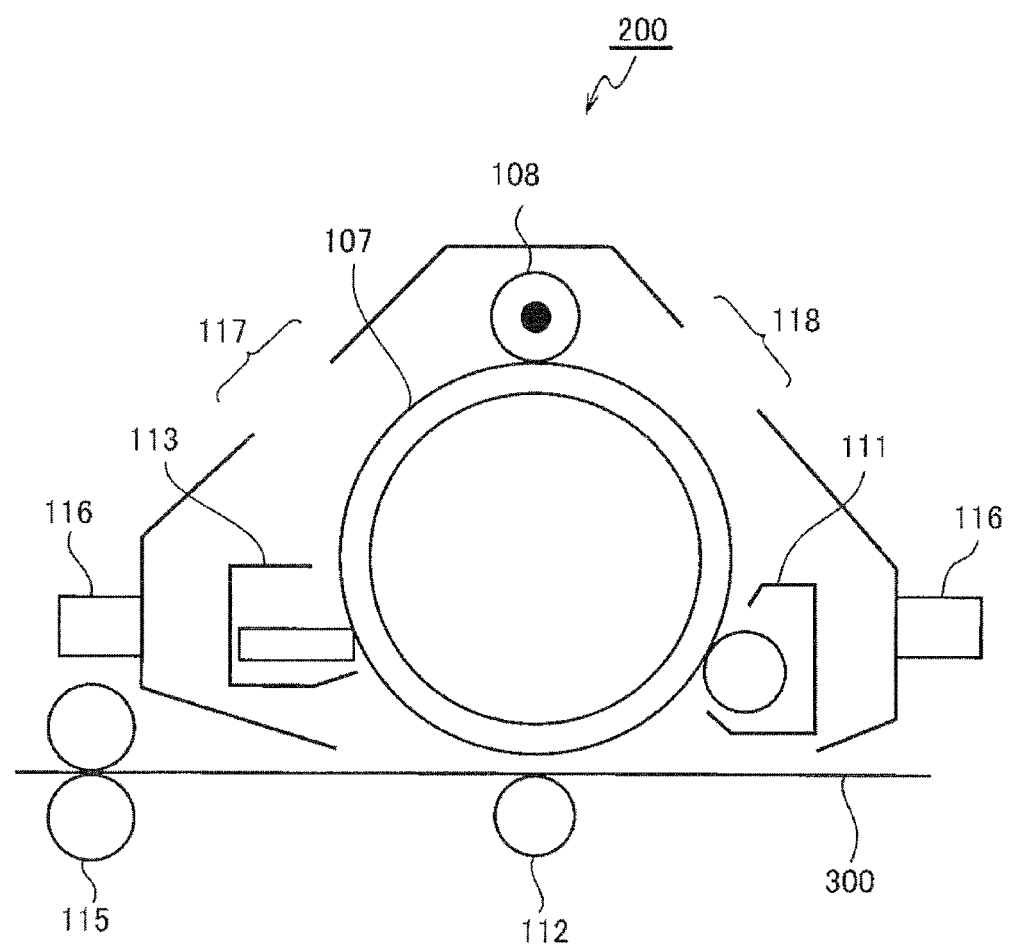
FIG. 2 is a schematic drawing showing an example of a process cartridge in the exemplary embodiment.

FIG. 2 is a schematic drawing showing a preferred example of a process cartridge housing an electrostatic image developer according to the exemplary embodiment. Process cartridge 200 is a combination of photoconductor 107, roller 108, developing apparatus 111, photoconductor cleaning apparatus 113, opening for exposure 118, and opening for antistatic exposure 117 integrated into one cartridge on mounting rail 116. In FIG. 2, reference numeral 300 indicates a transfer-receiving member.

Process cartridge 200 is freely attachable to and detachable from the image forming apparatus containing transfer apparatus 112, fixing apparatus 115, and other constituents (not shown).

Roller 108, developing apparatus 111, photoconductor cleaning apparatus 113, opening for exposure 118, and opening for antistatic exposure 117 included in process cartridge 200 shown in FIG. 2 may be selectively combined. The process cartridge in the exemplary embodiment includes photoconductor 107 and at least one constituent selected from the group consisting of roller 108, developing apparatus 111, cleaning apparatus (cleaning unit) 113, opening for exposure 118, and opening for antistatic exposure 117.

In the next place, the toner cartridge according to the exemplary embodiment will be explained. The toner cartridge according to the exemplary embodiment is a toner cartridge attachable to and detachable from an image forming apparatus and at least housing the electrostatic image developing toner for replenishment to be fed to the developing unit installed in the image forming apparatus.

The image forming apparatus shown in FIG. 1 is constructed such that toner cartridges 8Y, 8M, 8C and 8K are capable of attaching and detaching. Developing apparatus 4Y, 4M, 4C and 4K are connected to toner cartridges of corresponding colors through developer feed pipes (now shown). The toner cartridges are replaced with new cartridges when the toners in the toner cartridges are running short.

The exemplary embodiment will be described specifically with reference to examples, but the exemplary embodiment is by no means restricted thereto. In the examples "parts" and "%" are "parts by mass" and "% by mass", unless otherwise indicated.

Synthesis of rosin diol

Synthesis of Bisphenol F-Modified Rosin Diol, Specific Rosin Diol (20)

A stainless steel reaction vessel equipped with a stirrer, a heating apparatus, a condenser tube and a thermometer is charged with 111 parts of bisphenol F diglycidyl ether (trade name: jER806, manufactured by Mitsubishi Chemical Corporation) as a difunctional epoxy compound, 200 parts of disproportionated rosin (trade name: Pine Crystal KR614, manufactured by Arakawa Chemical Industries, Ltd.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (20) is obtained.

Synthesis of Ethylene Glycol-Modified Rosin Diol, Specific Rosin Diol (26)

A stainless steel reaction vessel equipped with a stirrer, a heating apparatus, a condenser tube and a thermometer is charged with 58 parts of ethylene glycol diglycidyl ether (trade name: EX810, manufactured by Nagase Chemtex Corporation) as a difunctional epoxy compound, 200 parts of disproportionated rosin (trade name: Pine Crystal KR614, manufactured by Arakawa Chemical Industries, Ltd.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (26) is obtained.

Synthesis of Hydrogenated Bisphenol A-Modified Rosin Diol, Specific Rosin Diol (33)

A stainless steel reaction vessel equipped with a stirrer, a heating apparatus, a condenser tube and a thermometer is charged with 107 parts of hydrogenated bisphenol A diglycidyl ether (trade name: EX252, manufactured by Nagase Chemtex Corporation) as a difunctional epoxy compound, 200 parts of disproportionated rosin (trade name: Pine Crystal KR614, manufactured by Arakawa Chemical Industries, Ltd.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (33) is obtained.

Synthesis of Propylene Glycol-Modified Rosin Diol, Specific Rosin Diol (10)

A stainless steel reaction vessel equipped with a stirrer, a heating apparatus, a condenser tube and a thermometer is charged with 87 parts of ethylene glycol diglycidyl ether (trade name: EX941, manufactured by Nagase Chemtex Corporation) as a difunctional epoxy compound, 200 parts of gum rosin having been subjected to purification treatment by distillation (distillation condition: 6.6 kPa, 220° C.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (10) is obtained.

Synthesis of Neopentyl Glycol-Modified Rosin Diol, Specific Rosin Diol (13)

A stainless steel reaction vessel equipped with a stirrer, a heating apparatus, a condenser tube and a thermometer is charged with 69 parts of neopentyl glycol diglycidyl ether (trade name: EX211, manufactured by Nagase Chemtex Corporation) as a difunctional epoxy compound, 200 parts of gum rosin having been subjected to purification treatment by distillation (distillation condition: 6.6 kPa, 220° C.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (13) is obtained.

Synthesis of Sebacic Acid-Modified Rosin Diol, Specific Rosin Diol (12)

A stainless steel reaction vessel equipped with a stirrer, a heating apparatus, a condenser tube and a thermometer is charged with 48 parts of sebacic acid diglycidyl ether as a difunctional epoxy compound, 200 parts of gum rosin having been subjected to purification treatment by distillation (distillation condition: 6.6 kPa, 220° C.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (12) is obtained.

Synthesis of Bisphenol A-Modified Rosin Diol, Specific Rosin Diol (18)

A stainless steel reaction vessel equipped with a stirrer, a heating apparatus, a condenser tube and a thermometer is charged with 113 parts of bisphenol A diglycidyl ether (trade name: jER828, manufactured by Mitsubishi Chemical Corporation) as a difunctional epoxy compound, 200 parts of disproportionated rosin (trade name: Pine Crystal KR614, manufactured by Arakawa Chemical Industries, Ltd.) as a rosin component, and 0.4 parts of tetraethylammonium bromide (manufactured by Tokyo Chemical Industry Co., Ltd.) as a reaction catalyst. The temperature is raised to 130° C. and ring-opening reaction of the acid groups of the rosin and the epoxy groups of the epoxy compound is carried out. The reaction is continued for 4 hours at the same temperature. At the time when the acid value reaches 0.5 mg KOH/g, the reaction is stopped and the exemplified compound, specific rosin diol (18) is obtained.

Preparation of Amorphous Polyester Resin Particles (and Dispersion Liquid Thereof)

Preparation of Amorphous Polyester Resin (A1) and Resin Particle Dispersion Liquid Thereof (a1)

Into a heat dried two necked flask, 120 parts of bisphenol F-modified rosin diol (specific rosin diol (20)), 29 parts of 1,3-propanediol, 81 parts of terephthalic acid, and $3.0 \times 10^{-3}$ parts based on the acid component (terephthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A1). The glass transition temperature Tg of resin (A1) is 61° C.

Into the emulsifying tank of a high temperature and high pressure emulsifying apparatus (CAVITRON CD1010, slit: 0.4 mm) are put 3,000 parts by mass of the above obtained amorphous polyester resin (A1), 1,000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a1).

Preparation of Amorphous Polyester Resin (A2) and Resin Particle Dispersion Liquid Thereof (a2)

Into a heat dried two necked flask, 398 parts of ethylene glycol-modified rosin diol (specific rosin diol (26)), 81 parts of terephthalic acid, and $3.0 \times 10^{-3}$ parts based on the acid component (terephthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A2). The glass transition temperature Tg of resin (A2) is 59° C.

Into the emulsifying tank of a high temperature and high pressure emulsifying apparatus (CAVITRON CD1010, slit: 0.4 mm) are put 3,000 parts by mass of the above obtained amorphous polyester resin (A2), 1,000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a2).

Preparation of Amorphous Polyester Resin (A3) and Resin Particle Dispersion Liquid Thereof (a3)

Into a heat dried two necked flask, 334 parts of hydrogenated bisphenol A-modified rosin diol (specific rosin diol (33)), 6 parts of 1,3-propanediol, 68 parts of isophthalic acid, 21 parts of dodecenylsuccinic acid, and $3.0\times10^{-3}$ parts based on the acid components (isophthalic acid and dodecenylsuccinic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A3). The glass transition temperature Tg of resin (A3) is 54° C.

Into the emulsifying tank of a high temperature and high pressure emulsifying apparatus (CAVITRON CD1010, slit: 0.4 mm) are put 3,000 parts by mass of the above obtained amorphous polyester resin (A3), 10000 parts by mass of ion exchange water, and 90 parts by mass of a surfactant, sodium dodecylbenzenesulfonate; and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a3).

Preparation of Amorphous Polyester Resin (A4) and Resin Particle Dispersion Liquid Thereof (a4)

Into a heat dried two necked flask, 341 parts of propylene glycol-modified rosin dial (specific rosin diol (10)), 6 parts of 1,3-propanediol, 81 parts of terephthalic acid, and $3.0\times10^{-3}$ parts based on the acid component (terephthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A4). The glass transition temperature Tg of resin (A4) is 65° C.

Into the emulsifying tank of a high temperature and high pressure emulsifying apparatus (CAVITRON CD1010, slit: 0.4 mm) are put 3,000 parts by mass of the above obtained amorphous polyester resin (A4), 1,000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a4).

Preparation of Amorphous Polyester Resin (A5) and Resin Particle Dispersion Liquid Thereof (a5)

Into a heat dried two necked flask, 420 parts of neopentyl glycol-modified rosin diol (specific rosin diol (13)), 81 parts of terephthalic acid, and $3.0\times10^3$ parts based on the acid component (terephthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A5). The glass transition temperature Tg of resin (A5) is 51° C.

Into the emulsifying tank of a high temperature and high pressure emulsifying apparatus (CAVITRON CD1010, slit: 0.4 mm) are put 3,000 parts by mass of the above obtained amorphous polyester resin (A5), 10000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a5).

Preparation of Amorphous Polyester Resin (A6) and Resin Particle Dispersion Liquid Thereof (a6)

Into a heat dried two necked flask, 34 parts of sebacic acid-modified rosin diol (specific rosin diol (12)), 391 parts of hydrogenated bisphenol A-modified rosin diol (specific rosin diol (33)), 58 parts of isophthalic acid, 37 parts of dodecenylsuccinic anhydride, and $3.0\times10^{-3}$ parts based on the acid components (isophthalic acid and dodecenylsuccinic anhydride) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A6). The glass transition temperature Tg of resin (A6) is 49° C.

Into the emulsifying tank of a high temperature and high pressure emulsifying apparatus (CAVITRON CD1010, slit: 0.4 mm) are put 3,000 parts by mass of the above obtained amorphous polyester resin (A6), 10000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a6).

Preparation of Amorphous Polyester Resin (A7) and Resin Particle Dispersion Liquid Thereof (a7)

Into a heat dried two necked flask, 294 parts of bisphenol A-modified rosin diol (specific rosin diol (18)), 24 parts of 1,6-hexanediol, and $3.0\times10^{-3}$ parts based on the acid components (terephthalic acid and dodecenylsuccinic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (A7). The glass transition temperature Tg of resin (A7) is 61° C.

Into the emulsifying tank of a high temperature and high pressure emulsifying apparatus (CAVITRON CD1010, slit:

0.4 mm) are put 3,000 parts by mass of the above obtained amorphous polyester resin (A7), 10000 parts by mass of ion exchange water, and 90 parts by mass of a surfactant, sodium dodecylbenzenesulfonate, and the mixture is melted by heating at 130° C. The reaction mixture is dispersed (a high temperature and high pressure emulsifying apparatus CAVITRON CD1010, slit: 0.4 mm) by revolution of 10,000 times at a flow rate of 3 L/m at 110° C. for 30 minutes, and then passes through a cooling tank and an amorphous resin particle dispersion liquid is collected, to thereby obtain amorphous polyester resin particle dispersion liquid (a7).

Preparation of Crystalline Polyester Resin Particles (and Dispersion Liquid Thereof)

Preparation of Crystalline Polyester Resin (B1) and Resin Particle Dispersion Liquid Thereof (b1)

Into a heat dried three necked flask, 174 parts of 1,10-decanediol, 202 parts of sebacic acid, and 0.05 parts of dibutyltin oxide as a catalyst are put. The air in the flask is made inert by pressure reducing operation with nitrogen gas, and the reaction mixture is stirred with a stirrer at 180° C. for 2 hours. Thereafter, the temperature is gradually raised up to 230° C. under reduced pressure, and stirring is continued for 5 hours. When the reaction solution reaches a viscous state, the solution is air-cooled, and the reaction is stopped to obtain synthesized crystalline polyester resin (B1). The melting temperature Tm of polyester resin (B1) is 75° C.

After that, crystalline polyester resin particle dispersion liquid (b1) is obtained on the same conditions as in the manufacture of amorphous polyester resin particle dispersion liquid (a1) with a high temperature and high pressure emulsifying apparatus (CAVITRON CD1010, slit: 0.4 mm).

Preparation of Crystalline Polyester Resin (B2) and Resin Particle Dispersion Liquid Thereof (b2)

Into a heat dried three necked flask, 160 parts of 1,9-nonanediol, 138 parts of 1,10-dodecane diacid, and 0.05 parts of dibutyltin oxide as a catalyst are put. The air in the flask is made inert by pressure reducing operation with nitrogen gas, and the reaction mixture is stirred with a stirrer at 180° C. for 2 hours. Thereafter, the temperature is gradually raised up to 230° C. under reduced pressure, and stirring is continued for 5 hours. When the reaction solution reaches a viscous state, the solution is air-cooled, and the reaction is stopped to obtain synthesized crystalline polyester resin (B2). The melting temperature Tm of polyester resin (B2) is 74° C.

After that, crystalline polyester resin particle dispersion liquid (b2) is obtained on the same conditions as in the manufacture of amorphous polyester resin particle dispersion liquid (a1) with a high temperature and high pressure emulsifying apparatus (CAVITRON CD1010, slit: 0.4 mm).

Preparation of Crystalline Polyester Resin (B3) and Resin Particle Dispersion Liquid Thereof (b3)

Into a heat dried three necked flask, 62 parts of ethylene glycol, 138 parts of 1,10-dodecane diacid, and 0.05 parts of dibutyltin oxide as a catalyst are put. The air in the flask is made inert by pressure reducing operation with nitrogen gas, and the reaction mixture is stirred with a stirrer at 180° C. for 2 hours. Thereafter, the temperature is gradually raised up to 230° C. under reduced pressure, and stirring is continued for 5 hours. When the reaction solution reaches a viscous state, the solution is air-cooled, and the reaction is stopped to obtain synthesized crystalline polyester resin (B3). The melting temperature Tm of polyester resin (B3) is 85° C.

After that, crystalline polyester resin particle dispersion liquid (b3) is obtained on the same conditions as in the manufacture of amorphous polyester resin particle dispersion liquid (a1) with a high temperature and high pressure emulsifying apparatus (CAVITRON CD1010, slit: 0.4 mm).

Preparation of Crystalline Polyester Resin (B4) and Resin Particle Dispersion Liquid Thereof (b4)

Into a heat dried two necked flask, 38 parts of 1,3-propanediol, 83 parts of isophthalic acid, and $3.0 \times 10^{-3}$ parts based on the acid component (isophthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (B4). The glass transition temperature Tg of resin (B4) is 65° C.

After that, crystalline polyester resin particle dispersion liquid (b4) is obtained on the same conditions as in the manufacture of amorphous polyester resin particle dispersion liquid (a1) with a high temperature and high pressure emulsifying apparatus (CAVITRON CD1010, slit: 0.4 mm).

Preparation of Crystalline Polyester Resin (B5) and Resin Particle Dispersion Liquid Thereof (b5)

Into a heat dried two necked flask, 59 parts of ethylene oxide adduct of bisphenol A, 25 parts of 1,6-hexanediol, 65 parts of isophthalic acid, and $3.0 \times 10^{-3}$ parts based on the acid component (isophthalic acid) of dibutyltin oxide are put. Nitrogen gas is introduced into the flask and the temperature is raised while maintaining inert atmosphere. Co-condensation polymerization reaction is performed at 150° C. to 230° C. for 12 hours to 20 hours. Thereafter, the pressure is gradually lowered at 210° C. to 250° C. to synthesize amorphous polyester resin (B5). The glass transition temperature Tg of resin (B5) is 52° C.

After that, crystalline polyester resin particle dispersion liquid (b5) is obtained on the same conditions as in the manufacture of amorphous polyester resin particle dispersion liquid (a1) with a high temperature and high pressure emulsifying apparatus (CAVITRON CD1010, slit: 0.4 mm).

Preparation of Coloring Agent Particle Dispersion Liquid

| | |
|---|---|
| Cyan pigment (Pigment Blue 15:3 (Copper Phthalocyanine, Dainichiseika Color & Chemicals Mfg. Co., Ltd.) | 100 parts by mass |
| Anionic surfactant (Neogen R, manufactured by Dai-Ichi Kogyo Seiyaku Co., Ltd.) | 15 parts by mass |
| Ion exchange water | 900 parts by mass |

The above components are mixed, dissolved, and dispersed with a high pressure impact type disperser Altimizer (HJP30006, manufactured by Sugino Machine Limited) for about 1 hour to prepare coloring agent particle dispersion liquid wherein the coloring agent (the cyan pigment) is dispersed. The average particle size of the coloring agent (the cyan pigment) is 0.13 μm, and the concentration of the coloring agent particles is 25% by mass.

Preparation of Release Agent Particle Dispersion Liquid

| | |
|---|---|
| Paraffin wax (HNP-9, manufactured by Nippon Seiro Co., Ltd.) | 200 parts by mass |
| Anionic surfactant (Neogen RK, manufactured by Dai-Ichi Kogyo Seiyaku Co., Ltd.) | 2 parts by mass |
| Ion exchange water | 800 parts by mass |

The above components are heated at 110° C., and dispersed with a homogenizer ULTRA-TURRAX T50 (manufactured by IKA), and then subjected to dispersion treatment with a high pressure MANTON GAULIN HOMOGENIZER (manufactured by Manton Gaulin) to prepare release agent particle dispersion liquid wherein the release agent is dispersed. The average particle size of the release agent in the release agent particle dispersion liquid is 0.21 μm, and the concentration of the release agent is 26% by mass.

Example 1

Manufacture of Toner Particles

| | |
|---|---|
| Amorphous polyester resin particle dispersion liquid (a1) | 90 parts by mass |
| Crystalline polyester resin particle dispersion liquid (b1) | 10 parts by mass |
| Coloring agent particle dispersion liquid | 50 parts by mass |
| Release agent particle dispersion liquid | 60 parts by mass |
| Aqueous solution of surfactant | 10 parts by mass |
| 0.3M nitric acid aqueous solution | 50 parts by mass |
| Ion exchange water | 500 parts by mass |

The above components are put in a round flask, and dispersed with a homogenizer (ULTRA-TURRAX T50, manufactured by IKA), and then heated up to 42° C. in an oil bath for heating and retained for 30 minutes. After confirming that aggregated particles are formed, 100 parts by mass of amorphous polyester resin particle dispersion liquid (a1) is added and retained for further 30 minutes.

Subsequently, nitrilotriacetic acid salt (Chelest 70, manufactured by Chubu Chelest Co., Ltd.) is added so as to account for 3% of the entire liquid. 1N sodium hydroxide aqueous solution is then gently added thereto to reach pH of 7.2, the reaction product is stirred while heating up to 85° C., and retained for 3.0 hours. After that, the reaction product is filtered, washed with ion exchange water, and dried with a vacuum drier to obtain toner particles 1.

The particle sizes of toner particles 1 are measured with Coulter Multisizer. The volume average particle diameter D50 is 3.9 μm, and particle size distribution coefficient GSD is 1.22.

(Manufacture of Toner 1)

To 100 mass parts of toner particles 1, 3 parts by mass of silica particles (obtained by sol/gel method, quantity of surface treatment by hexamethyldisilazane of 5% by mass, average primary particle size of 120 nm), and 1 part by mass of silica particles (R972, manufactured by Nippon Aerosil), and the mixture is blended with a 5-liter Henschel mixer at a peripheral speed of 30 m/s for 15 minutes. The coarse particles are removed with a sieve having an aperture of 45 μm to obtain toner 1.

Example 2

| | |
|---|---|
| Amorphous polyester resin (A2) | 85 parts by mass |
| Amorphous polyester resin (B3) | 15 parts by mass |
| Cyan pigment (Pigment Blue 15:3 (Copper Phthalocyanine, Dainichiseika Color & Chemicals Mfg. Co., Ltd.) | 5.5 parts by mass |
| Paraffin wax (HNP-9, manufactured by Nippon Seiro | 10 parts by mass |

The above components are kneaded with an extruder and pulverized with a pulverizer of surface pulverizing system. The particles are finely ground with a wind power system classifier (Turbo Classifier (TC-15N), manufactured by Nisshin Engineering), and coarse particles are classified. The process for obtaining middle size particles is repeated three times, and toner particles 2 having a volume average particle diameter of 8 μm are obtained.

Toner 2 is manufactured by using toner particles 2 by the same manner as in Example 1.

Example 3

Toner 3 is manufactured by manufacturing toner particles 3 by the same manner as in Example 1 except for using amorphous polyester resin particle dispersion liquid (a3) in place of (a1), and using crystalline polyester resin particle dispersion liquid (b2) in place of (b1).

Example 4

Toner 4 is manufactured by manufacturing toner particles 6 by the same manner as in Example 1 except for using amorphous polyester resin particle dispersion liquid (a4) in place of (a1), and crystalline polyester resin particle dispersion liquid (b2) in place of (b1).

Example 5

Toner 5 is manufactured by manufacturing toner particles 6 by the same manner as in Example 1 except for using amorphous polyester resin particle dispersion liquid (a5) in place of (a1).

Example 6

Toner 6 is manufactured by manufacturing toner particles 6 by the same manner as in Example 1 except for using amorphous polyester resin particle dispersion liquid (a6) in place of (a1), and using amorphous polyester resin particle dispersion liquid (b4) in place of crystalline polyester resin particle dispersion liquid (b1).

Example 7

Toner 7 is manufactured by manufacturing toner particles 7 by the same manner as in Example 1 except for using amorphous polyester resin particle dispersion liquid (a7) in place of (a1), and using amorphous polyester resin particle dispersion liquid (b5) in place of crystalline polyester resin particle dispersion liquid (b1).

Example 8

Toner 8 is manufactured by manufacturing toner particles 8 by the same manner as in Example 2 except for using amorphous polyester resin (A1) in place of (A2), and using crystalline polyester resin particles (B1) in place of (B3).

Example 9

Toner 9 is manufactured by manufacturing toner particles 9 by the same manner as in Example 1 except for using amorphous polyester resin particle dispersion liquid (a4) in place of (a1), and using amorphous polyester resin particle dispersion liquid (b2) in place of crystalline polyester resin particle dispersion liquid (b1).

Comparative Example 1

Comparative toner 1 is manufactured by manufacturing comparative toner particles 1 by the same manner as in Example 1 except for using amorphous polyester resin particle dispersion liquid (b5) in place of crystalline polyester resin particle dispersion liquid (b1).

Comparative Example 2

Comparative toner 2 is manufactured by manufacturing comparative toner particles 2 by the same manner as in Example 2 except for not using crystalline polyester resin (B3).

Comparative Example 3

Comparative toner 3 is manufactured by manufacturing comparative toner particles 3 by the same manner as in Example 3 except for not using crystalline polyester resin particle dispersion liquid (b2).

Comparative Example 4

Comparative toner 4 is manufactured by manufacturing comparative toner particles 4 by the same manner as in Example 4 except for using amorphous polyester resin particle dispersion liquid (b3) in place of crystalline polyester resin particle dispersion liquid (b2).

Comparative Example 5

Comparative toner 5 is manufactured by manufacturing comparative toner particles 5 by the same manner as in Example 5 except for using amorphous polyester resin particle dispersion liquid (b3) in place of crystalline polyester resin particle dispersion liquid (b1).

Comparative Example 6

Comparative toner 6 is manufactured by manufacturing comparative toner particles 6 by the same manner as in Example 6 except for not using amorphous polyester resin (B4).

Comparative Example 7

Comparative toner 7 is manufactured by manufacturing comparative toner particles 7 by the same manner as in Example 7 except for not using amorphous polyester resin (B5).

[Evaluation]

After manufacturing developers from the toners obtained in the above examples, the following evaluations are performed. The results of evaluations are shown in Tables 1 to 3 below.

The developers are manufactured as follows.

Ferrite particles (average particle size: 50 μm, manufactured by Powder Tech Co., Ltd.) (100 parts) and 1.5 parts of a methyl methacrylate resin (volume average molecular weight: 95,000, manufactured by Mitsubishi Rayon Co., Ltd.) are put in a pressure kneader with 500 parts of toluene, stirred and mixed at ordinary temperature for 15 minutes, the temperature is raised to 70° C. while mixing under reduced pressure to distill off the toluene, followed by cooling, and filtering with a filter having a pore diameter of 105 μm for sizing to manufacture a resin-covered ferrite carrier.

The resin-covered ferrite carrier and the toner obtained in each example are mixed to prepare a developer having toner concentration of 7% by mass (two-component electrostatic image developer).

(Analysis)

Each resin obtained in each example is taken out according to ordinary method as described above, and dissolution parameter (SP value) and weight average molecular weight (Mw) of each resin are examined.

(Scratch Resistance of Fixed Image)

Scratch resistance of fixed image is evaluated as follows.

By using 1.5 mg/cm² of each toner and Mirror Coat Platinum as recording paper, and unfixed image is fixed at a temperature higher than the lowest fixing temperature by 20° C. The obtained fixed image is subjected to scratch test by applying a load of 100 g to a needle having a tip diameter of 0.2 mm, and scanning 30 mm or more.

Criteria of the evaluation are as follows.
A: A depression is seen but the density not lowered.
B: Lowering in density is observed.
C: A part of the substrate is peeled.
D: Completely peeled.

TABLE 1

|  |  | Example 1 | Example 2 | Example 3 | Example 4 | Example 5 |
|---|---|---|---|---|---|---|
| First PE resin | Kind | A1 | A2 | A3 | A4 | A5 |
|  | Specific rosin diol | (20) | (26) | (33) | (10) | (13) |
|  |  | 120 parts | 398 parts | 334 parts | 341 parts | 420 parts |
|  | Specific rosin diol |  |  |  |  |  |
|  | 1,3-Propanediol | 29 parts |  | 6 parts | 6 parts |  |
|  | 1,6-Hexanediol |  |  |  |  |  |
|  | Terephthalic acid | 81 parts | 81 parts |  | 81 parts | 81 parts |
|  | Isophthalic acid |  |  | 68 parts |  |  |
|  | Dodecenylsuccinic Anhydride |  |  | 21 parts |  |  |
|  | SP value (cal/cm³)$^{1/2}$ | 10.45 | 9.69 | 9.95 | 9.60 | 9.48 |
|  | Mw | 60,000 | 120,000 | 20,000 | 4,000 | 6,000 |

TABLE 1-continued

|  |  | Example 1 | Example 2 | Example 3 | Example 4 | Example 5 |
|---|---|---|---|---|---|---|
| Second PE resin | Kind | B1 (crystalline) | B3 (crystalline) | B2 (crystalline) | B2 (crystalline) | B1 (crystalline) |
|  | Monomer component | Decanediol + sebacid acid | Ethylene glycol + dodecanoic diacid | Nonanediol + dodecanoic diacid | Nonanediol + dodecanoic diacid | Decanediol + sebacid acid |
|  | SP value $(cal/cm^3)^{1/2}$ | 9.08 | 9.32 | 9.0 | 9.0 | 9.08 |
|  | Difference in SP value between first PE resin and second PE resin | 1.37 | 0.37 | 0.95 | 0.60 | 0.4 |
|  | Manufacturing method of toner | EA method | Pulverization method | EA method | EA method | EA method |
|  | Scratch resistance | A | C | A | C | B |

TABLE 2

|  |  | Example 6 | Example 7 | Example 8 | Example 9 |
|---|---|---|---|---|---|
| First PE resin | Kind | A6 | A7 | A1 | A4 |
|  | Specific rosin diol | (12) 34 parts | (18) 294 parts | (20) 120 parts | (10) 341 parts |
|  | Specific rosin diol | (33) 391 parts |  |  |  |
|  | 1,3-Propanediol |  |  | 29 parts | 6 parts |
|  | 1,6-Hexanediol |  | 24 parts |  |  |
|  | Terephthalic acid |  |  | 81 parts | 81 parts |
|  | Isophthalic acid | 58 parts |  |  |  |
|  | Dodecenylsuccinic anhydride | 37 parts |  |  |  |
|  | SP value $(cal/cm^3)^{1/2}$ | 9.07 | 9.71 | 10.45 | 9.60 |
|  | Mw | 10,000 | 40,000 | 60,000 | 20,000 |
| Second PE resin | Kind | B4 (amorphous) | B5 (amorphous) | B1 (crystalline) | B2 (crystalline) |
|  | Monomer component | Propanediol + isophthalic acid | Bisphenol A-EO + hexanediol + isophthalic acid | Decanediol + sebacic acid | Nonanediol + dodecanoic diacid |
|  | SP value $(cal/cm^3)^{1/2}$ | 11.26 | 10.65 | 9.08 | 9.0 |
|  | Difference in SP value between first PE resin and second PE resin | 2.19 | 0.94 | 1.37 | 0.60 |
|  | Manufacturing method of toner | EA method | EA method | Pulverization method | EA method |
|  | Scratch resistance | C | B | B | A |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| First PE resin | Kind | A1 | A2 | A3 | A4 | A5 | A6 | A7 |
|  | Specific rosin diol | (20) 120 parts | (26) 398 parts | (33) 334 parts | (10) 341 parts | (13) 420 parts | (12) 34 parts | (18) 294 parts |
|  | Specific rosin diol |  |  |  |  |  | (33) 391 parts |  |
|  | 1,3-Propanediol | 29 parts |  |  | 6 parts | 6 parts |  |  |
|  | 1,6-Hexanediol |  |  |  |  |  |  | 24 parts |
|  | Terephthalic acid | 81 parts | 81 parts |  | 81 parts | 81 parts |  |  |
|  | Isophthalic acid |  |  | 68 parts |  |  | 58 parts |  |
|  | Dodecenylsuccinic anhydride |  |  | 21 parts |  |  | 37 parts |  |
|  | SP value $(cal/cm^3)^{1/2}$ | 10.45 | 9.69 | 9.95 | 9.60 | 9.48 | 9.07 | 9.71 |
|  | Mw | 60,000 | 120,000 | 20,000 | 4,000 | 6,000 | 10,000 | 40,000 |
| Second PE resin | Kind | B5 (amorphous) | None | None | B3 (crystalline) | B3 (crystalline) | Non | None |
|  | Monomer component | Bisphenol A-EO + hexanediol + isophthalic acid |  |  | Ethylene glycol + dodecanoic diacid | Ethylene glycol + dodecanoic diacid |  |  |
|  | SP value $(cal/cm^3)^{1/2}$ | 10.65 |  |  | 9.32 | 9.32 |  |  |
|  | Difference in SP value between first PE resin and second PE resin | 0.2 |  |  | 0.28 | 0.16 |  |  |
|  | Manufacturing method of toner | EA method | Pulverization method | EA method | EA method | EA method | EA method | EA method |
|  | Scratch resistance | D | D | D | D | D | D | D |

From the above results, it is seen that the scratch resistance of a fixed image is high in the examples as compared with comparative examples.

It is seen that in Examples 1, 3 and 9 where crystalline polyester resin is used as the second polyester resin, the scratch resistance of a fixed image is higher as compared with Examples 6 and 7.

It is also seen that in Example 9 where the weight average molecular weight of the first polyester resin is in a proper range, the scratch resistance of a fixed image is higher as compared with Example 4.

In Examples 1, 3, 5 and 9 where toners are prepared by aggregation coalescence method, the scratch resistance of a fixed image is higher as compared with Examples 2 and 8.

Reference Example

Reference Example 101

Reference toner 101 is manufactured by manufacturing reference toner particles 101 by the same manner as in Example 1.

Reference Example 102

Reference toner particles 102 and reference toner 102 are manufactured by the same manner as in Example 1 except for using amorphous polyester resin particle dispersion liquid (a4) in place of (a1) and crystalline polyester resin particle dispersion liquid (b3) in place of (b1).

Reference Examples 103 to 107

Reference toner particles 103 to 107 and reference toners 103 to 107 are manufactured by the same manner as in Examples 3 to 7, respectively.

Reference Example 108

Reference toner particles 108 and reference toner 108 are manufactured by the same manner as in Example 1 except for using amorphous polyester resin particle dispersion liquid (a2) in place of (a1) and not using crystalline polyester resin particle dispersion liquid (b1).

Reference Example 109

Reference toner 109 is manufactured by manufacturing reference toner particles 109 by the same manner as in Example 9.

Reference Example 201

Reference toner particles 201 and reference toner 201 are manufactured by the same manner as in Example 2 except for using amorphous polyester resin (A1) in place of (A3) and crystalline polyester resin (B1) in place of (B2).

Reference Example 202

| | |
|---|---|
| Amorphous polyester resin (A4) | 85 parts by mass |
| Amorphous polyester resin (B3) | 15 parts by mass |
| Cyan pigment (PV FAST BLUE, a phthalocyanine pigment, manufactured by Dainichiseika Color & Chemicals Mfg. Co., Ltd.) | 5.5 parts by mass |
| Release agent (polyalkylene wax HNP 51, manufactured by Nippon Seiro o., Ltd.) | 9 parts by mass |
| Ethyl acetate | 200 parts by mass |

The above materials are put in a beaker and stirred with a homogenizer (ULTRA-TURRAX T50 (manufactured by IKA) at 7,800 rpm, dissolved and dispersed. Ion exchange water (250 parts) and 0.2 parts of sodium dodecylbenzenesulfonate are added thereto and stirred at 70° C. with a homogenizer (ULTRA-TURRAX T50 (manufactured by IKA) at 7,800 rpm. The obtained suspension (500 parts) is poured into a flask equipped with a thermometer, and the solvent is removed by stirring at 45° C. under reduced pressure for 1 hour. The reaction product is then filtered, washed with ion exchange water and dried to obtain reference toner particles 202.

Reference toner 202 is manufactured from reference toner particles 202 in the same manner as in Example 1.

Reference Example 203

Reference toner particles 203 and reference toner 203 are manufactured by the same manner as in Reference Example 202 except for using amorphous polyester resin (A3) in place of (A4) and crystalline polyester resin (B2) in place of (B3).

Reference Example 204

Reference toner particles 204 and reference toner 204 are manufactured by the same manner as in Example 2 except for using amorphous polyester resin (A4) in place of (A2) and crystalline polyester resin (B2) in place of (B3).

Reference Example 205

Reference toner particles 205 and reference toner 205 are manufactured by the same manner as in Example 2 except for using amorphous polyester resin (A5) in place of (A2) and crystalline polyester resin (B1) in place of (B3).

Reference Example 206

Reference toner particles 206 and reference toner 206 are manufactured by the same manner as in Example 2 except for using amorphous polyester resin (A6) in place of (A2) and crystalline polyester resin (B4) in place of (B3).

Reference Example 207

Reference toner particles 207 and reference toner 207 are manufactured by the same manner as in Reference Example 202 except for using amorphous polyester resin (A7) in place of (A4) and crystalline polyester resin (B5) in place of (B3).

Reference Example 208

Reference toner particles 208 and reference toner 208 are manufactured by the same manner as in Example 2 except for not using crystalline polyester resin (B3).

Reference Example 209

Reference toner particles 209 and reference toner 209 are manufactured by the same manner as in Example 2 except for using amorphous polyester resin (A4) in place of (A2) and crystalline polyester resin (B2) in place of (B3).

[Evaluation]

Developers are manufactured by using the toners obtained in Reference Examples, and evaluated as follows. The results obtained are shown in Tables 4 to 7 below.

(Evaluation of Image Quality Unevenness)

Image quality unevenness of each fixed image using the developer is visually evaluated. The criteria of the evaluation are as follows.

A: There is no image quality unevenness.
B: Image quality unevenness is slightly observed.
C: There is image quality unevenness.
D: There is conspicuous image quality unevenness.

TABLE 4

|  |  | Reference Example 101 | Reference Example 102 | Reference Example 103 | Reference Example 104 | Reference Example 105 |
|---|---|---|---|---|---|---|
| First PE resin | Kind | A1 | A4 | A3 | A4 | A5 |
|  | Specific rosin diol | (20) 120 parts | (10) 341 parts | (33) 334 parts | (10) 341 parts | (13) 420 parts |
|  | Specific rosin diol |  |  |  |  |  |
|  | 1,3-Propanediol | 29 parts | 6 parts | 6 parts | 6 parts |  |
|  | 1,6-Hexanediol |  |  |  |  |  |
|  | Terephthalic acid | 81 parts | 81 parts |  | 81 parts | 81 parts |
|  | Isophthalic acid |  |  | 68 parts |  |  |
|  | Dodecenylsuccinic Anhydride |  |  | 21 parts |  |  |
|  | SP value $(cal/cm^3)^{1/2}$ | 10.45 | 9.60 | 9.95 | 9.60 | 9.48 |
|  | Mw | 60,000 | 20,000 | 20,000 | 4,000 | 6,000 |
| Second PE resin | Kind | B1 (crystalline) | B3 (crystalline) | B2 (crystalline) | B2 (crystalline) | B1 (crystalline) |
|  | Monomer component | Decanediol + sebacid acid | Ethylene glycol + dodecanoic diacid | Nonanediol + dodecanoic diacid | Nonanediol + dodecanoic diacid | Decanediol + sebacid acid |
|  | SP value $(cal/cm^3)^{1/2}$ | 9.08 | 9.32 | 9.0 | 9.0 | 9.08 |
|  | Difference in SP value between first PE resin and second PE resin | 1.37 | 0.28 | 0.95 | 0.60 | 0.4 |
|  | Manufacturing method of toner | EA method | EA method | EA method | EA method | EA method |
|  | Evaluation of image quality unevenness | A | A | A | A | A |

TABLE 5

|  |  | Reference Example 106 | Reference Example 107 | Reference Example 108 | Reference Example 109 |
|---|---|---|---|---|---|
| First PE resin | Kind | A6 | A7 | A2 | A4 |
|  | Specific rosin diol | (12) 34 parts | (18) 294 parts | (26) 398 parts | (10) 341 parts |
|  | Specific rosin diol | (33) 391 parts |  |  |  |
|  | 1,3-Propanediol |  |  |  | 6 parts |
|  | 1,6-Hexanediol |  | 24 parts |  |  |
|  | Terephthalic acid |  |  | 81 parts | 81 parts |
|  | Isophthalic acid | 58 parts |  |  |  |
|  | Dodecenylsuccinic Anhydride | 37 parts |  |  |  |
|  | SP value $(cal/cm^3)^{1/2}$ | 9.07 | 9.71 | 9.69 | 9.60 |
|  | Mw | 10,000 | 40,000 | 120,000 | 20,000 |
| Second PE resin | Kind | B4 (amorphous) | B5 (amorphous) |  | B2 (crystalline) |
|  | Monomer component | Propanediol + isophthalic acid | Bisphenol A-EO + hexanediol + isophthalic acid |  | Nonanediol + dodecanoic diacid |
|  | SP value $(cal/cm^3)^{1/2}$ | 11.26 | 10.65 |  | 9.0 |
|  | Difference in SP value between first PE resin and second PE resin | 2.19 | 0.94 |  | 0.60 |
|  | Manufacturing method of toner | EA method | EA method | EA method | EA method |
|  | Evaluation of image quality unevenness | B | B | B | A |

TABLE 6

|  |  | Reference Example 201 | Reference Example 202 | Reference Example 203 | Reference Example 204 | Reference Example 205 |
|---|---|---|---|---|---|---|
| First PE resin | Kind | A1 | A4 | A3 | A4 | A5 |
|  | Specific rosin diol | (20) 120 parts | (10) 341 parts | (33) 334 parts | (10) 341 parts | (13) 420 parts |
|  | Specific rosin diol |  |  |  |  |  |
|  | 1,3-Propanediol | 29 parts | 6 parts | 6 parts | 6 parts |  |
|  | 1,6-Hexanediol |  |  |  |  |  |
|  | Terephthalic acid | 81 parts | 81 parts |  | 81 parts | 81 parts |
|  | Isophthalic acid |  |  | 68 parts |  |  |

TABLE 6-continued

|  |  | Reference Example 201 | Reference Example1 202 | Reference Example 203 | Reference Example 204 | Reference Example 205 |
|---|---|---|---|---|---|---|
|  | Dodecenylsuccinic Anhydride |  |  | 21 parts |  |  |
|  | SP value $(cal/cm^3)^{1/2}$ | 10.45 | 9.60 | 9.95 | 9.60 | 9.48 |
|  | Mw | 60,000 | 4,000 | 20,000 | 4,000 | 6,000 |
| Second PE resin | Kind | B1 (crystalline) | B3 (crystalline) | B2 (crystalline) | B2 (crystalline) | B1 (crystalline) |
|  | Monomer component | Decanediol + sebacid acid | Ethylene glycol + dodecanoic diacid | Nonanediol + dodecanoic diacid | Nonanediol + dodecanoic diacid | Decanediol + sebacid acid |
|  | SP value $(cal/cm^3)^{1/2}$ | 9.08 | 9.32 | 9.0 | 9.0 | 9.08 |
|  | Difference in SP value between first PE resin and second PE resin | 1.37 | 0.28 | 0.95 | 0.60 | 0.4 |
|  | Manufacturing method of toner | Pulverization method | Dissolution suspension method | Dissolution suspension method | Pulverization Method | Pulverization method |
|  | Evaluation of image quality unevenness | D | C | C | D | D |

TABLE 7

|  |  | Reference Example 206 | Reference Example1 207 | Reference Example 208 | Reference Example 209 |
|---|---|---|---|---|---|
| First PE resin | Kind | A6 | A7 | A2 | A4 |
|  | Specific rosin diol | (12) 34 parts | (18) 294 parts | (26) 398 parts | (10) 341 parts |
|  | Specific rosin diol | (33) 391 parts |  |  |  |
|  | 1,3-Propanediol |  |  |  | 6 parts |
|  | 1,6-Hexanediol |  | 24 parts |  |  |
|  | Terephthalic acid |  |  | 81 parts | 81 parts |
|  | Isophthalic acid | 58 parts |  |  |  |
|  | Dodecenylsuccinic Anhydride | 37 parts |  |  |  |
|  | SP value $(cal/cm^3)^{1/2}$ | 9.07 | 9.71 | 9.69 | 9.60 |
|  | Mw | 10,000 | 40,000 | 120,000 | 20,000 |
| Second PE resin | Kind | B4 (amorphous) | B5 (amorphous) |  | B2 (crystalline) |
|  | Monomer component | Propanediol + isophthalic acid | Bisphenol A-EO + hexanediol + isophthalic acid |  | Nonanediol + dodecanoic diacid |
|  | SP value $(cal/cm^3)^{1/2}$ | 11.26 | 10.65 |  | 9.0 |
|  | Difference in SP value between first PE resin and second PE resin | 2.19 | 0.94 |  | 0.60 |
|  | Manufacturing method of toner | Pulverization method | Dissolution suspension method | Pulverization method | Pulverization Method |
|  | Evaluation of image quality unevenness | D | C | D | D |

From the above results, it is understood that in the toners in Reference Examples 101 to 109 which are manufactured with the specific rosin diols as the alcohol components and by aggregation coalescence method, image quality unevenness is small as compared with the toners in Reference Examples 201 to 209 which are manufactured by pulverization method or dissolution suspension method.

That is, a toner giving small image quality unevenness is obtained through a process of preparing a raw material particle dispersion liquid in which at least specific polyester resin particles, which is a polycondensation product of at least a carboxylic acid component and an alcohol component including rosin, are dispersed, a process of forming aggregated particles by aggregating at least polyester resin particles in raw material particle dispersion liquid, and a process of forming toner particles by heating aggregated particle dispersion liquid in which aggregated particles are dispersed and fusing and coalescing the aggregated particles.

Incidentally, resin particles other than the specific polyester resins, coloring agent particles, release agent particles and other components are contained in raw material particle dispersion liquids, according to necessity.

Since polyester resin having an alcohol component containing rosin has bulky structure, a release agent and a pigment are difficult to be homogeneously dispersed by the dissolution suspension method of dissolving and dispersing a binder resin in a solvent.

On the other hand, when a toner is manufactured by the method of aggregating polyester resin particle dispersion liquid, heating, fusing and coalescing, release agents and pigments are more homogeneously dispersed in the toner, accordingly it is presumed that image quality unevenness is small.

Abbreviations in Tables 1 to 7 are shown below.
PE resin: Polyester resin
Bisphenol A-EO: Ethylene oxide adduct of bisphenol A
EA method: Aggregation coalescence method
SP value: Solubility parameter
Mw: Weight average molecular weight While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An electrostatic image developing toner comprising:
an amorphous first polyester resin that is a polycondensation product of at least a carboxylic acid component and a rosin-containing alcohol component represented by the following formula (1):

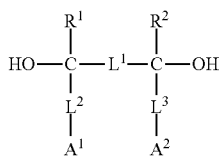

(1)

where in the formula (1),
each of $R^1$ and $R^2$ independently represents a hydrogen atom or a methyl group,
each of $L^1$, $L^2$, and $L^3$ independently represents a divalent linking group selected from the group consisting of a carbonyl group, an ester group, an ether group, a sulfonyl group, a chained alkylene group which may have a substituent, a cyclic alkylene group which may have a substituent, an arylene group which may have a substituent, and a combination thereof,
$L^1$ and $L^2$ or $L^1$ and $L^3$ may form a ring, and
each of $A^1$ and $A^2$ independently represents a rosin ester group; and
a second polyester resin having a difference (absolute value) in parameter of solubility relative to the first polyester resin of from about 0.3 $(cal/cm^3)^{1/2}$ to about 3 $(cal/cm^3)^{1/2}$.

2. The electrostatic image developing toner according to claim 1, wherein the second polyester resin is a crystalline polyester resin.

3. The electrostatic image developing toner according to claim 1, wherein a weight average molecular weight of the first polyester resin is from about 5,000 to about 200,000.

4. An electrostatic image developer comprising at least the electrostatic image developing toner according to claim 1.

5. A toner cartridge containing the electrostatic image developing toner according to claim 1, wherein the cartridge is attachable to and detachable from an image forming apparatus.

6. A process cartridge comprising a developing unit that contains the electrostatic image developer according to claim 4 and forms a toner image by developing an electrostatic image formed on an image holding member with the electrostatic image developer, wherein the cartridge is attachable to and detachable from an image forming apparatus.

7. An image forming apparatus comprising:
an image holding member,
a charging unit that charges the image holding member,
an electrostatic image forming unit that forms an electrostatic image on a surface of the charged image holding member,
a developing unit that contains the electrostatic image developer according to claim 4 and forms a toner image by developing the electrostatic image formed on the image holding member with the electrostatic image developer,
a transfer unit that transfers the toner image formed on the image holding member onto a transfer-receiving member, and
a fixing unit that fixes the toner image transferred to the transfer-receiving member.

8. An image forming method comprising:
charging an image holding member,
forming an electrostatic image on a surface of the charged image holding member,
developing the electrostatic image formed on the image holding member with the electrostatic image developer according to claim 4 to form a toner image,
transferring the toner image formed on the image holding member to a transfer-receiving member, and
fixing the toner image transferred to the transfer-receiving member.

9. A method for manufacturing an electrostatic image developing toner, comprising:
preparing a first resin particle dispersion liquid having dispersed therein an amorphous first polyester resin that is a polycondensation product of at least a carboxylic acid component and rosin-containing alcohol component represented by the following formula (1):

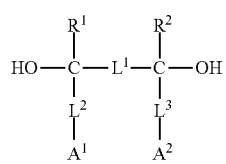

(1)

where in the formula (1),
each of $R^1$ and $R^2$ independently represents a hydrogen atom or a methyl group,
each of $L^1$, $L^2$, and $L^3$ independently represents a divalent linking group selected from the group consisting of a carbonyl group, an ester group, an ether group, a sulfonyl group, a chained alkylene group which may have a substituent, a cyclic alkylene group which may have a substituent, an arylene group which may have a substituent, and a combination thereof,
$L^1$ and $L^2$ or $L^1$ and $L^3$ may form a ring, and
each of $A^1$ and $A^2$ independently represents a rosin ester group; and
preparing a second resin particle dispersion liquid having dispersed therein a second polyester resin having a difference (absolute value) in parameter of solubility relative to the first polyester resin of from about 0.3 $(cal/cm^3)^{1/2}$ to about 3 $(cal/cm^3)^{1/2}$,
forming an aggregated particle dispersion liquid containing aggregated particles dispersed therein by at least mixing the first resin particle dispersion liquid and the second resin particle dispersion liquid, and aggregating the first polyester resin and the second polyester resin, and
forming toner particles by heating the aggregated particle dispersion liquid containing aggregated particles dispersed therein, and fusing and coalescing the aggregated particles.

10. The electrostatic image developing toner according to claim 1, wherein the amorphous first polyester resin has a rosin structure on a side chain thereof.

11. The electrostatic image developing toner according to claim 1, wherein a ratio of a content of the second polyester resin to a content of the amorphous first polyester resin is 0.01 to 0.25.

12. The electrostatic image developing toner according to claim 1, wherein a ratio of a content of the second polyester resin to a content of the amorphous first polyester resin is 0.05 to 0.18.

13. The electrostatic image developing toner according to claim 1, wherein an acid value of the amorphous first polyester resin is from 3 mg KOH/g to 30 mg KOH/g.

* * * * *